(12) United States Patent
Kang et al.

(10) Patent No.: US 11,999,383 B2
(45) Date of Patent: Jun. 4, 2024

(54) PARKING ASSIST SYSTEM WITH IMPROVED AVOIDANCE STEERING CONTROL AND METHOD THEREOF

(71) Applicants: HYUNDAI MOTOR COMPANY, Seoul (KR); KIA CORPORATION, Seoul (KR)

(72) Inventors: Sun Woo Kang, Suwon-si (KR); Se Hyeok Kim, Hwaseong-si (KR); Sun Woo Jeong, Siheung-si (KR); Ki Ho Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 302 days.

(21) Appl. No.: 17/530,371

(22) Filed: Nov. 18, 2021

(65) Prior Publication Data

US 2022/0204039 A1 Jun. 30, 2022

(30) Foreign Application Priority Data

Dec. 24, 2020 (KR) .................. 10-2020-0183845

(51) Int. Cl.
*B60W 60/00* (2020.01)
*B62D 6/00* (2006.01)

(52) U.S. Cl.
CPC ........ *B60W 60/0016* (2020.02); *B62D 6/001* (2013.01); *B60W 2420/403* (2013.01); *B60W 2420/54* (2013.01)

(58) Field of Classification Search
CPC ............. B60W 30/06; B60W 2420/42; B62D 15/0285; G06V 20/586; G06V 20/56; B60R 2300/806
See application file for complete search history.

(56) References Cited

U.S. PATENT DOCUMENTS

| | | | |
|---|---|---|---|
| 11,092,688 B1* | 8/2021 | Wang | G01S 15/876 |
| 11,117,518 B2 | 9/2021 | Spiegel | |
| 2019/0308609 A1* | 10/2019 | Gieseke | B60R 1/00 |
| 2019/0366922 A1 | 12/2019 | Spiegel | |
| 2021/0107464 A1* | 4/2021 | Ishinoda | B62D 15/0285 |
| 2021/0163068 A1* | 6/2021 | Zhu | B62D 15/0285 |
| 2021/0342605 A1* | 11/2021 | Walessa | G06F 18/22 |
| 2021/0406560 A1* | 12/2021 | Park | G06T 7/70 |
| 2022/0041105 A1* | 2/2022 | Jochmann | G06V 10/243 |
| 2022/0383749 A1* | 12/2022 | Ishikawa | B60W 40/04 |

FOREIGN PATENT DOCUMENTS

JP 2019211480 A 12/2019

* cited by examiner

*Primary Examiner* — Ryan Rink
(74) *Attorney, Agent, or Firm* — Lempia Summerfield Katz LLC

(57) ABSTRACT

A parking assist system with improved avoidance steering control and a method thereof are provided. The parking assist system includes a sensor fusion calculation module that fuses sensing data of an ultrasonic sensor and image data of an SVM camera to calculate position information of an object with respect to a current location of a vehicle and a parking assist module that avoids the object based on the position information and performs steering control of the vehicle for autonomous parking. The parking assist system accurately detects the object on a position departing from a field of view (FOV) of the ultrasonic sensor and performs avoidance steering robust to a surrounding object upon autonomous parking.

17 Claims, 30 Drawing Sheets

PARKING ASSIST SYSTEM WITH IMPROVED AVOIDANCE STEERING CONTROL AND METHOD THEREOF

CROSS-REFERENCE TO RELATED APPLICATION

This application claims the benefit of priority to Korean Patent Application No. 10-2020-0183845, filed in the Korean Intellectual Property Office on Dec. 24, 2020, the entire contents of which are incorporated herein by reference.

TECHNICAL FIELD

The present disclosure relates to a parking assist system with robustly improved avoidance steering control of an autonomous parking vehicle and to a method thereof.

BACKGROUND

In general, remote smart parking assist (RSPA) is a system, which assists the vehicle in recognizing a parking space itself using an ultrasonic sensor and control steering, braking, speed, forward shift, reverse shift, and the like to park.

As such, conventional RSPA detects things such as surrounding vehicles based on the ultrasonic sensor and performs avoidance steering of the detected things to perform parking.

However, because there is a limitation in a field of view (FOV) in a lateral direction in the ultrasonic sensor, it is difficult for the existing RSPA based on the ultrasonic sensor to determine a control reference point for an object located within a distance, which is sensed by an outer ultrasonic sensor, but is not sensed by an inner ultrasonic sensor. Thus, a longitudinal position is inaccurately identified.

As such, as the information about the longitudinal position of the thing is inaccurately calculated, avoidance steering is robustly controlled upon autonomous parking in the RSPA.

SUMMARY

The present disclosure has been made to solve the above-mentioned problems occurring in the prior art while advantages achieved by the prior art are maintained intact.

An aspect of the present disclosure provides a parking assist system with improved avoidance steering control. The parking assist system includes a sensor fusion calculation module that fuses sensing data of a sensor module and image data of a surround view monitor (SVM) camera to calculate position information of an object with respect to a current position of a vehicle. The parking assist system also includes a parking assist module that avoids the object based on the position information and performs steering control of the vehicle for autonomous parking to accurately detect the object on a position departing from a field of view (FOV) of the sensor module and perform avoidance steering robust to a surrounding object upon autonomous parking. The present disclosure also provides a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a parking assist system with improved avoidance steering control may include a sensor module that detects a distance from a vehicle and an object using sensing data obtained by scanning the periphery of the vehicle. The parking assist system may also include a surround view monitor (SVM) camera that captures an image around the vehicle to obtain image data capable of detecting a position and a direction of the object. The parking assist system may also include a sensor fusion calculation module that fuses the sensing data of the sensor module and the image data of the SVM camera to calculate position information of the object with respect to a current position of the vehicle. The parking assist system may also include a parking assist module that avoids the object based on the position information and performs steering control of the vehicle for autonomous parking.

Furthermore, the sensor fusion calculation module may include a cell setting device that divides a region around the vehicle on the image data obtained by the SVM camera into cells, each of which has a certain interval, and assign an address to each cell. The sensor fusion calculation module may also include an object detecting device that detects presence or absence of the object based on the image data and classifies a type of the detected object to detect the object, which is present in a parking area. The sensor fusion calculation module may also include an object map generator that matches and stores a cell address of a position where the object is detected on the image data with classification information of the object and generates an object map indicating an object distribution situation for the parking area.

Furthermore, the sensor fusion calculation module may include a boundary object specifying device that determines whether a boundary object detected on a region of interest (ROI) where front- and rear-view image data and both side-view image data are overlapped is identical to any of objects detected from at least one of the front- and rear-view image data or the side-view image data and specify the object.

Furthermore, the boundary object specifying device may calculate a first centroid of a boundary object image detected from the front- and rear-view image data and a second centroid of a boundary object image detected from the side-view image data. The boundary object specifying device may also determine a boundary object, which has the minimum distance between the first centroid and the second centroid calculated for boundary objects to which the same object classification code is matched, as the same object.

Furthermore, the sensor module may comprise an ultrasonic sensor configured to obtain the sensing data using a time of flight (TOF) of an ultrasonic wave. The sensor fusion calculation module may further include an obstacle position correcting device that corrects and stores a position of the object detected from the image data and stored on the object map, based on the sensing data of the ultrasonic sensor.

Furthermore, the object position correcting device may select a point of the object closest to the ultrasonic sensor as reference coordinates. The object position correcting device may also move the reference coordinates on the same cell and may set the reference coordinates to correction coordinates of the object, until meeting a circle which is around the ultrasonic sensor and has a return path of sensing data for the reference coordinates as a radius. The object position correcting device may also move coordinates of the other points of the object in parallel in the same manner along the direction where the reference coordinates move to the correction coordinates to correct the position of the object.

Furthermore, the parking assist module may include an avoidance reference point determining device that selects a point of the object the vehicle should avoid when the vehicle enters a parking space as an avoidance reference point, based on coordinates indicating a point of the object stored in the object map. The parking assist module may also include an alignment angle calculating device that calculates an alignment angle at which the vehicle should be aligned such that the vehicle entering the parking space avoids the object to park.

Furthermore, the avoid reference point determining device may set a vehicle portion, which should avoid a contact with an object adjacent to the vehicle when the vehicle enters the parking space to a vehicle reference point. The avoid reference point determining device may also set certain regions in a +y-axis direction at one side of an x-axis and a −y-axis direction at the other side on a local coordinate system with respect to the center of the vehicle to a first reference point ROI and a second reference point ROI. The avoid reference point determining device may also select a point with the minimum distance from the vehicle reference point among object points on each reference point ROI as the avoidance reference point on each reference point ROI.

Furthermore, the parking assist module may further include a weight varying device that increases and applies a weight in a y-axis direction as a distance between from the vehicle to the object decreases. Thus, a point on coordinates where an x-axis distance from a vehicle reference point is close has a high weight to be selected as the avoidance reference point when an x-axis distance between the vehicle and the object is greater than a predetermined reference distance. Also, a point on coordinates where a y-axis distance from the vehicle reference point is close has a high weight to be selected as the avoidance reference point when the x-axis distance between the vehicle and the object is less than the reference distance.

Furthermore, the alignment angle calculating device may calculate an average of angles defined by a vehicle reference point set on the front center of the vehicle and the avoidance reference point as an initial alignment angle of the vehicle entering the parking space. The alignment angle calculating device may also calculate an amount of change in alignment angle which should increase and decrease for avoidance steering depending to a degree to which the vehicle enters the parking space. The alignment angle calculating device may also provide the calculated initial alignment angle and the calculated amount of change in alignment angle as data for avoidance steering control of the vehicle.

Furthermore, the alignment angle calculating device may set a region between a first avoidance reference line and a center reference line to a first avoidance direction ROI and may set a region between a second avoidance reference line and the center reference line to a second avoidance direction ROI. The first avoidance reference line and the second avoidance reference line may be used. The first avoidance reference line and the second avoidance reference line may be straight lines, each of which is parallel to the center reference line being a straight line indicating a current initial alignment angle and passes through each avoidance reference point. The alignment angle calculating device may also obtain the sum of distances between points of an object in the first avoidance direction ROI and the first avoidance reference line and the sum of distances between points of objects in the second avoidance direction ROI and the second avoidance reference line. The alignment angle calculating device may also calculate an amount of change in alignment angle for correcting the initial alignment angle such that a difference between the two sums of distances becomes minimal.

According to another aspect of the present disclosure, a parking assist method with improved avoidance steering control may include obtaining an object image around a parking space using front- and rear-view image data and side-view image data of a vehicle, the front- and rear-view image data and the side-view image data being captured by an SVM camera. The parking assist method may also include detecting a position of an object and a distance to the object using sensing data obtained by a sensor module. The parking assist method may also include storing coordinates of the object which is detected from the image data and is corrected in position by the sensing data in an object map. The parking assist method may also include selecting an avoidance reference point required for avoidance of the vehicle among coordinates of points making up the object and calculating an alignment angle of the vehicle, the alignment angle being required for avoidance steering based on the avoidance reference point.

Furthermore, the parking assist method may further include determining whether a boundary object detected on an ROI where the front- and rear-view image data and the side-view image data are overlapped is identical to any of objects detected from at least one of the front- and rear-view image data or the side-view image data and specifying the object, in receiving the image data and the sensing data and generating the object map.

Furthermore, the specifying of the object may include selecting an object where an image is detected on the ROI among the front- and rear-view image data and the side-view image data as the boundary object. The specifying of the object may also include calculating a first centroid and a second coordinates which are plane centers for point coordinates of the boundary object detected from each of the front- and rear-view image data and the side-view image. The specifying of the object may also include comparing distances between the first centroid and the second centroid calculated for the boundary objects to which the same obstacle classification code is matched and specifying two boundary objects having a minimum distance as the same object.

Furthermore, the calculating of the alignment angle of the vehicle may include selecting a point of the object closest to the sensor module as reference coordinates in generating the object map and moving the reference coordinates in a direction facing a position where the SVM camera is installed to generate correction coordinates of the object, until meeting a circle which is around the sensor module and has a return path of sensing data for the reference coordinates as a radius. The calculating of the alignment angle of the vehicle may also include moving coordinates of the other points of the object in parallel in the same manner along a direction where the reference coordinates to the correction coordinates.

Furthermore, the calculating of the alignment angle of the vehicle may include selecting a point of the object the vehicle should avoid as the avoidance reference point, based on a distance relationship between point coordinates of the object stored in the object map and a vehicle reference point set on a vehicle portion which should avoid a contact with the object in the vehicle entering the parking space. The calculating of the alignment angle of the vehicle may also include calculating the alignment angle required to perform steering control of the vehicle, such that the vehicle avoids the avoidance reference point and enters the parking space.

Furthermore, the selecting as the avoidance reference point may include setting certain regions in a +y-axis direction at one side of an x-axis and a −y-axis direction at the other side on a local coordinate system with respect to the center of the vehicle to a first reference point ROI and a second reference point ROI. The selecting as the avoidance reference point may also include selecting coordinates of the object with the minimum distance from the vehicle reference point among points of the object on the first reference point ROI and the second reference point ROI as the avoidance reference point.

Furthermore, the selecting as the avoidance reference point may further include increasing and applying a weight in a y-axis direction as a distance between the vehicle which is entering the parking space and the object decreases, in selecting a point with the minimum distance from the vehicle reference point among a plurality of object points on a reference point ROI.

Furthermore, the calculating of the alignment angle may include calculating an average of angles defined by a vehicle reference point set on the front center of the vehicle and the avoidance reference point as an initial alignment angle such that the vehicle avoids the object and enters the parking space. The calculating of the alignment angle may also include setting a region between a first avoidance reference line and a center reference line to a first avoidance direction ROI and setting a region between a second avoidance reference line and the center reference line to a second avoidance direction ROI, using the first avoidance reference line and the second avoidance reference line. The first avoidance reference line and the second avoidance reference line may be straight lines, each of which is parallel to the center reference line being a straight line indicating the initial alignment angle and passes through each avoidance reference point. The calculating of the alignment angle may also include obtaining the sum of distances between points of an object in the first avoidance direction ROI and the first avoidance reference line and the sum of distances between points of objects in the second avoidance direction ROI and the second avoidance reference line and calculating an amount of change in alignment angle for correcting the initial alignment angle such that a difference between the two sums of distances becomes minimal.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
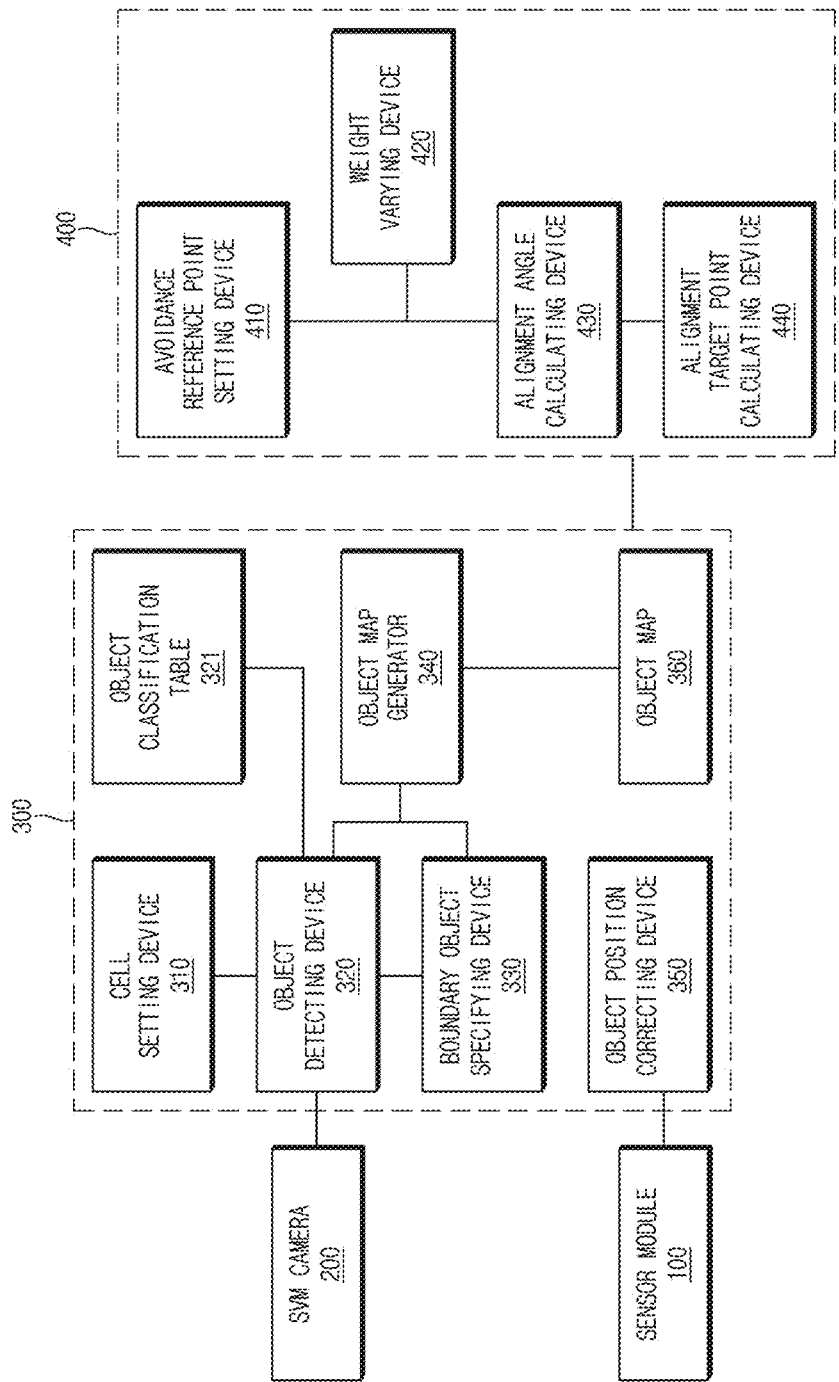
FIG. 1 is a block diagram illustrating a configuration of a parking assist system with improved avoidance steering control according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component. The terms do not limit the nature, sequence, or order of the constituent components. Unless otherwise defined, All terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art and should not be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-19.

Figure 2A:
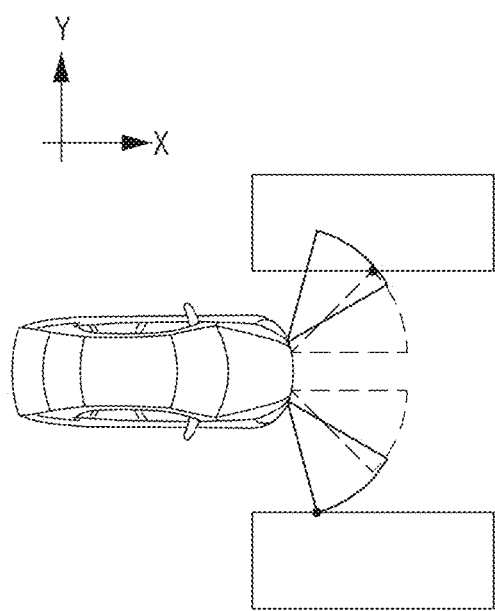
FIGS. 2A and 2B are drawings illustrating that a field of view (FOV) is increased upon avoidance steering control according to an embodiment of the present disclosure.
Figure 2B:
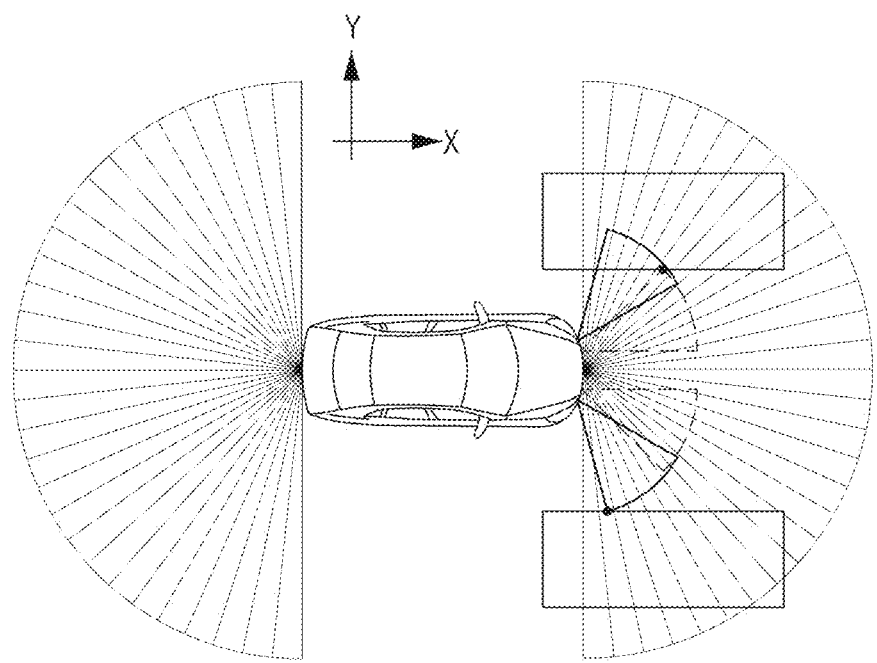
Figure 3A:
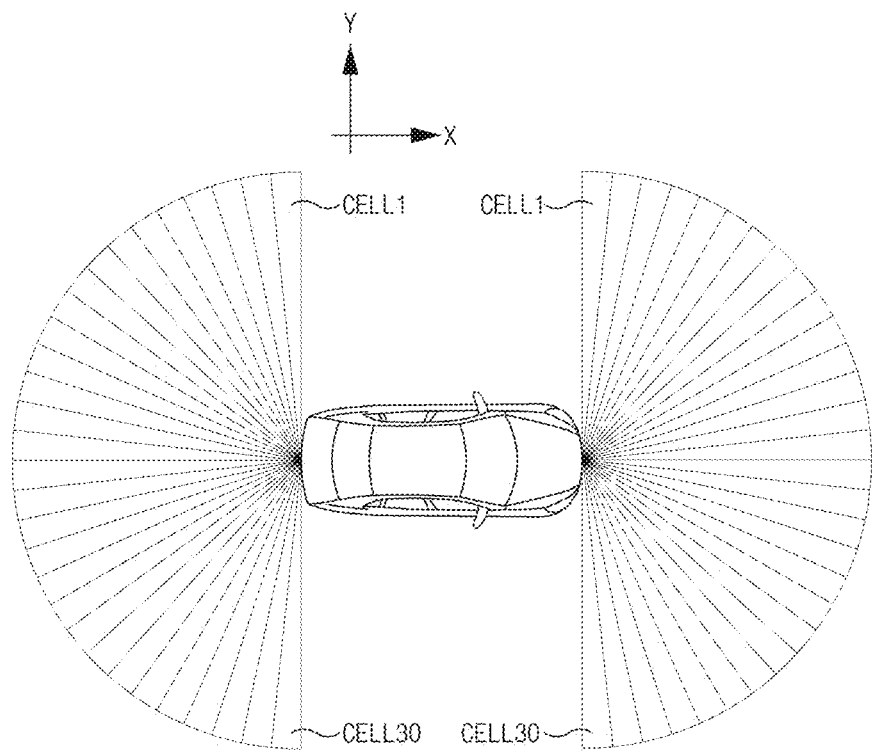
FIGS. 3A and 3B are drawings illustrating FOVs of front- and rear-view image data and side-view image data, which are captured by a surround view monitor (SVM) camera, according to an embodiment of the present disclosure.
Figure 3B:
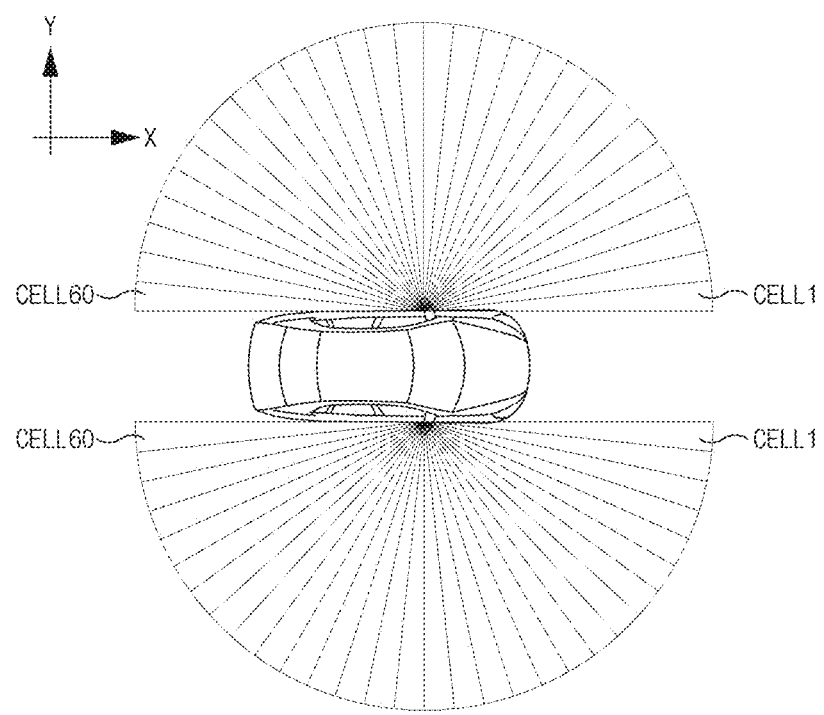
Figure 4:
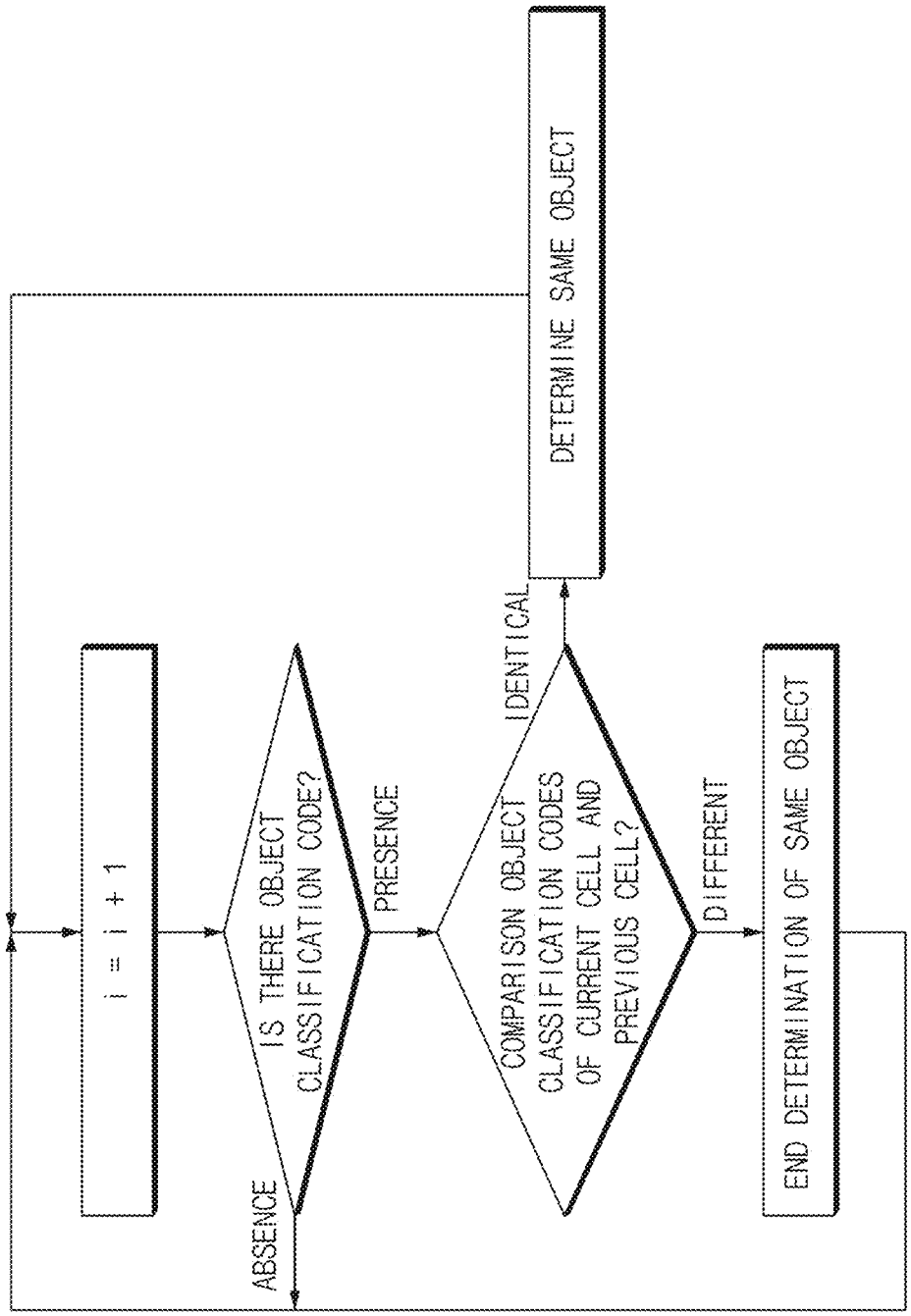
FIG. 4 is a flowchart illustrating a process of detecting and clustering an object using an image indicated on image data according to an embodiment of the present disclosure.
Figure 5A:
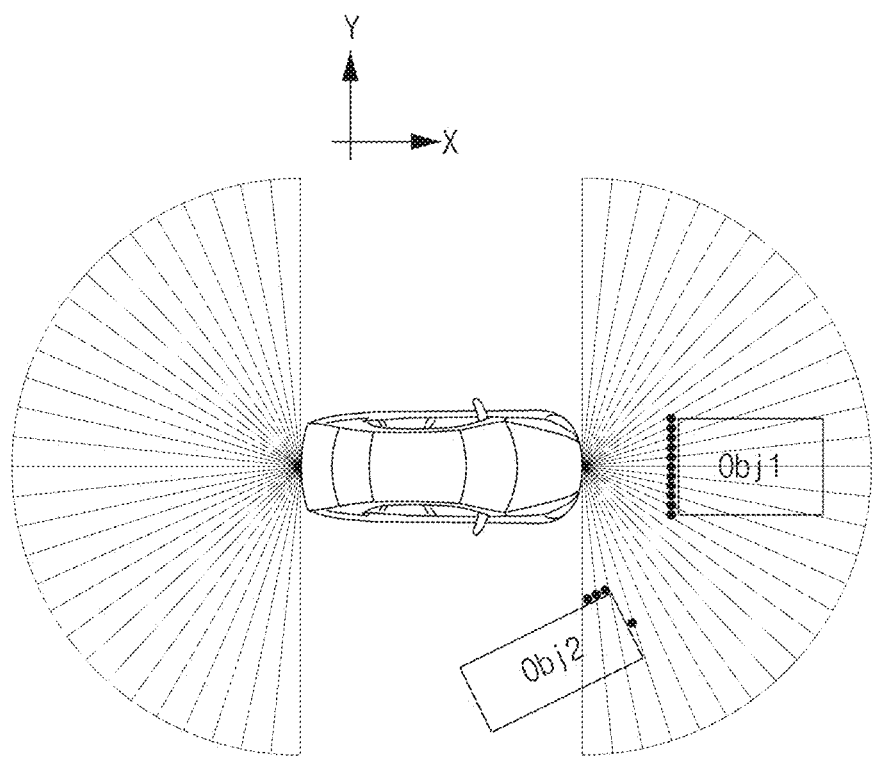
FIGS. 5A and 5B are drawings illustrating detecting an object using an image included in front- and rear-view image data and side-view image data of a vehicle according to an embodiment of the present disclosure.
Figure 5B:
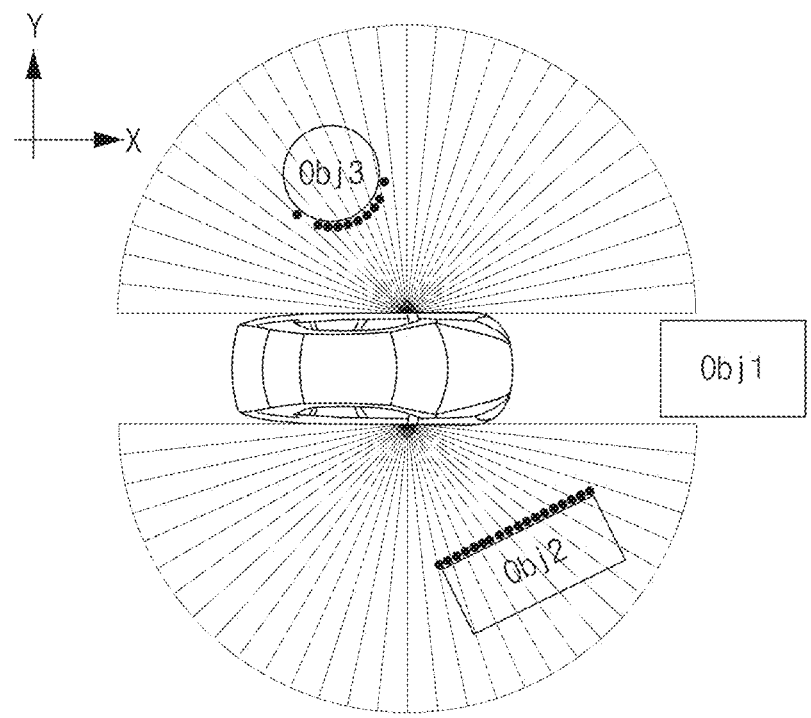
Figure 6A:
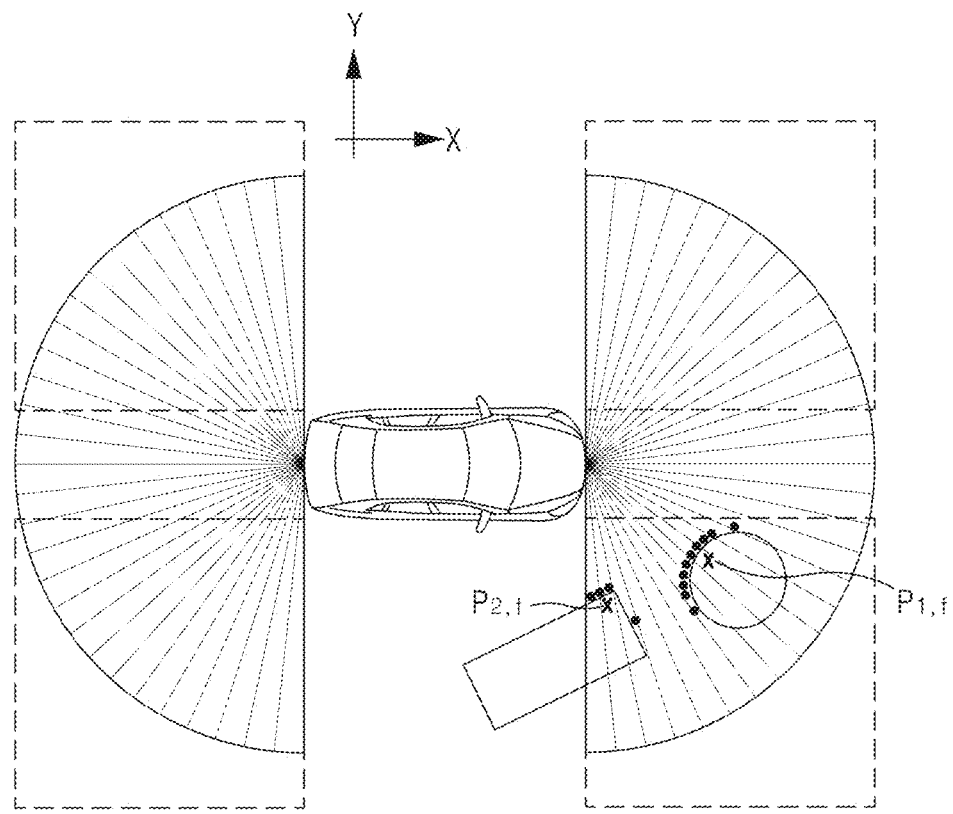
FIGS. 6A and 6B are drawings illustrating that a boundary object image indicated on a region of interest (ROI) is detected from front- and rear-view image data and side-view image data according to an embodiment of the present disclosure.
Figure 6B:
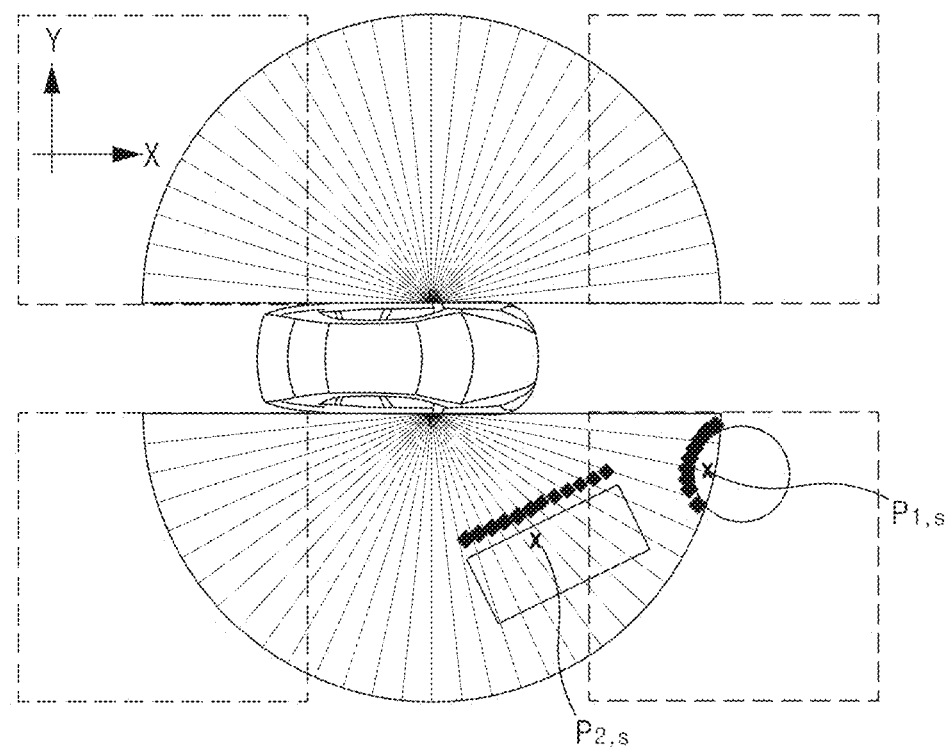
Figure 7:
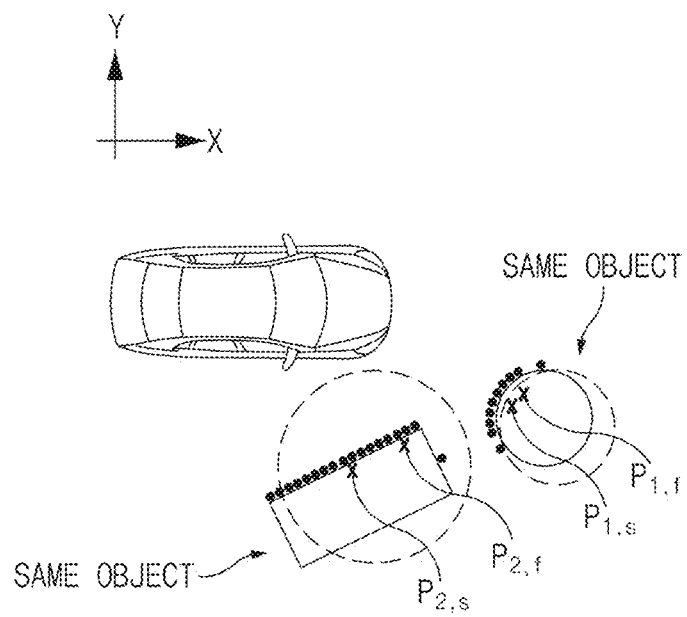
FIG. 7 is a drawing illustrating comparing distances between a first centroid and a second centroid and specifying a boundary object according to an embodiment of the present disclosure.
Figure 8A:
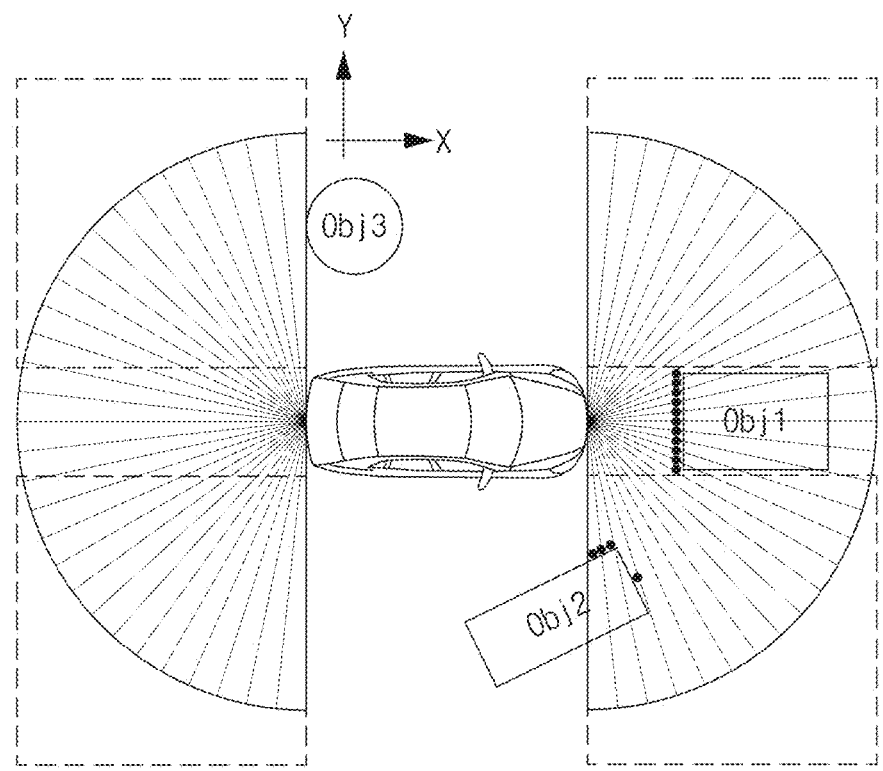
FIGS. 8A, 8B, and 8C are drawings illustrating matching and storing coordinates of an object on a local coordinate system in the center of a vehicle according to an embodiment of the present disclosure.
Figure 8B:
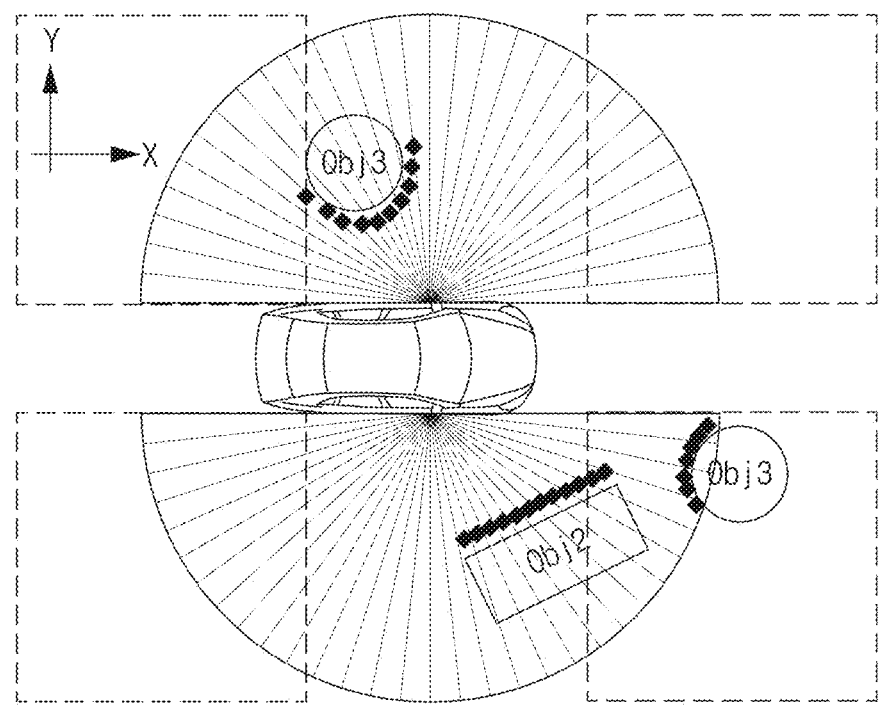
Figure 8C:
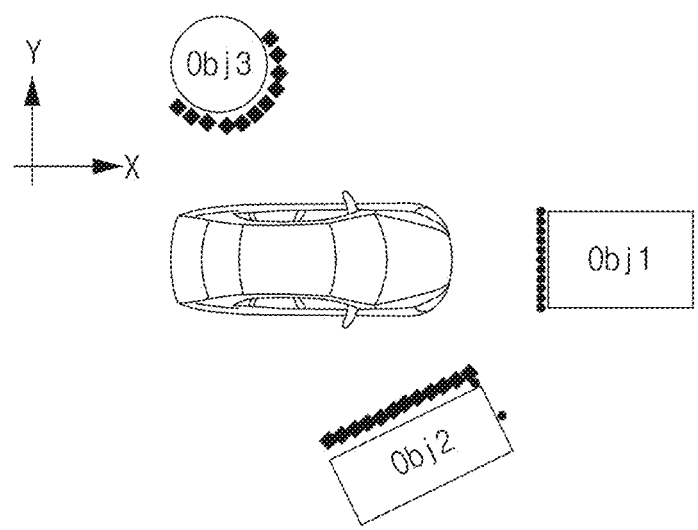
Figure 9:
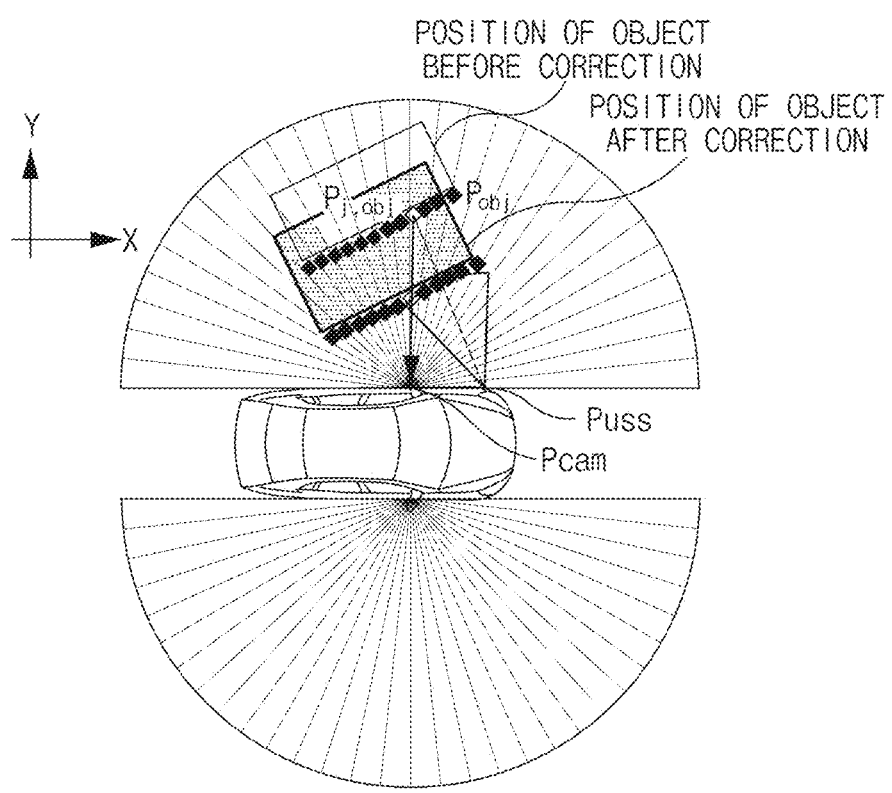
FIG. 9 is a drawing illustrating correcting a position of an object by sensing data (TOF) according to an embodiment of the present disclosure.
Figure 10:
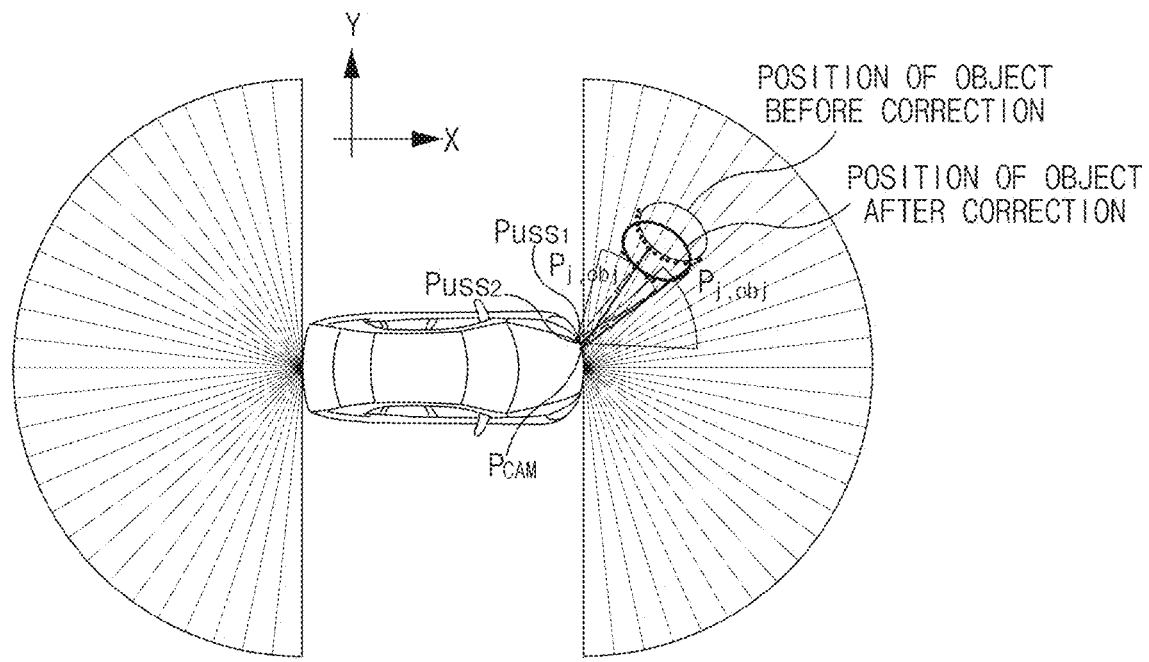
FIG. 10 is a drawing illustrating correcting a position of an object when several sensing data are received for one object according to an embodiment of the present disclosure.
Figure 11:
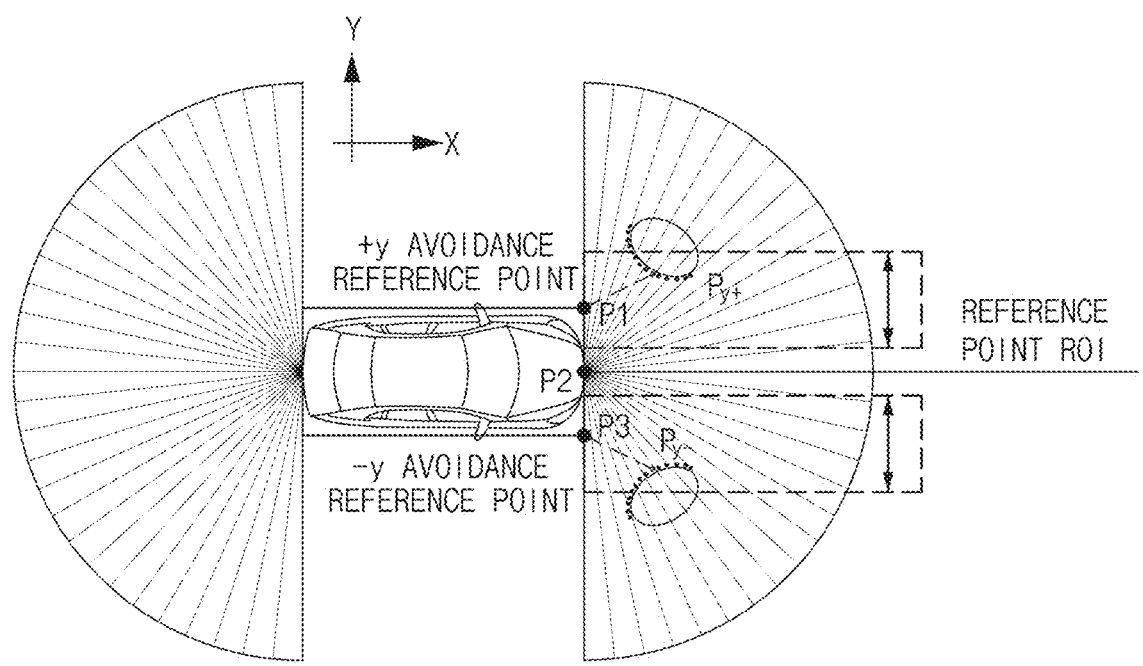
FIG. 11 is a drawing illustrating selecting a reference point ROI and an avoidance reference point according to an embodiment of the present disclosure.
Figure 12A:
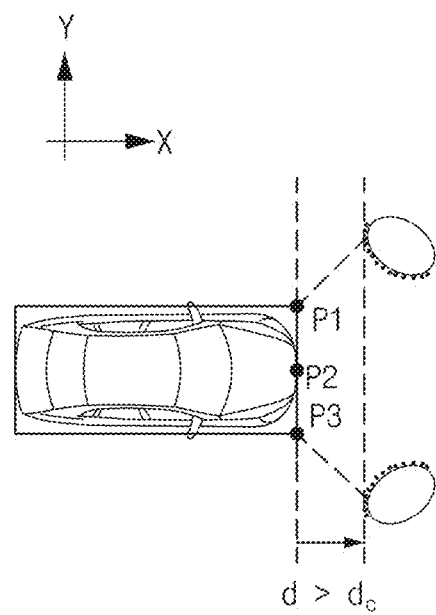
FIGS. 12A, 12B, 12C, and 12D are drawings illustrating a change in weight coefficient according to a change in x-axis distance between a vehicle and an object according to an embodiment of the present disclosure.
Figure 12B:
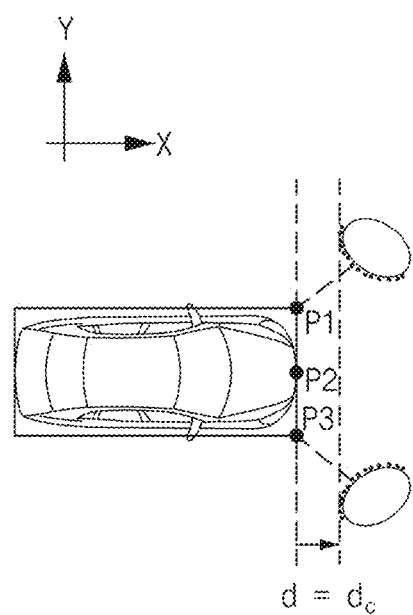
Figure 12C:
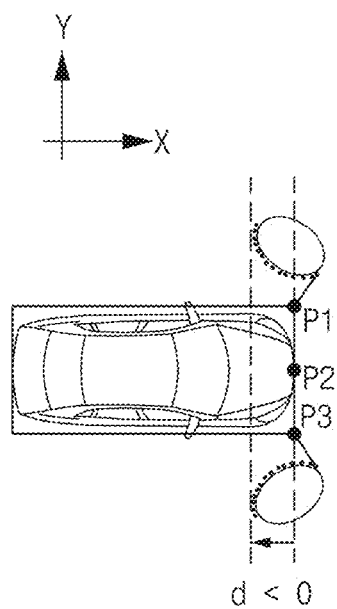
Figure 13:
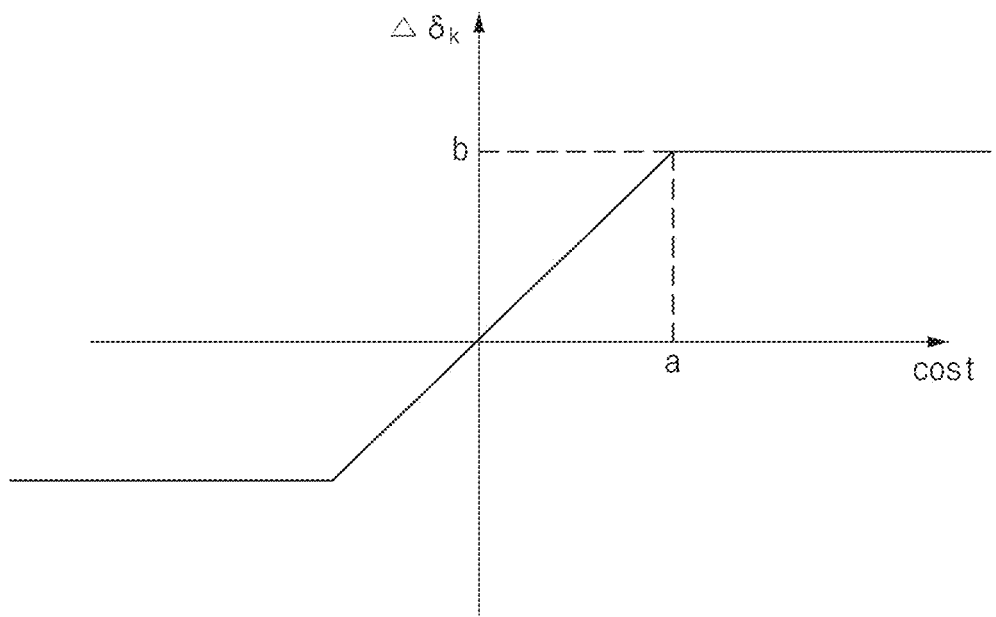
FIG. 13 is a graph illustrating an example of setting a tuning parameter for calculating a cost according to an embodiment of the present disclosure.
Figure 14:
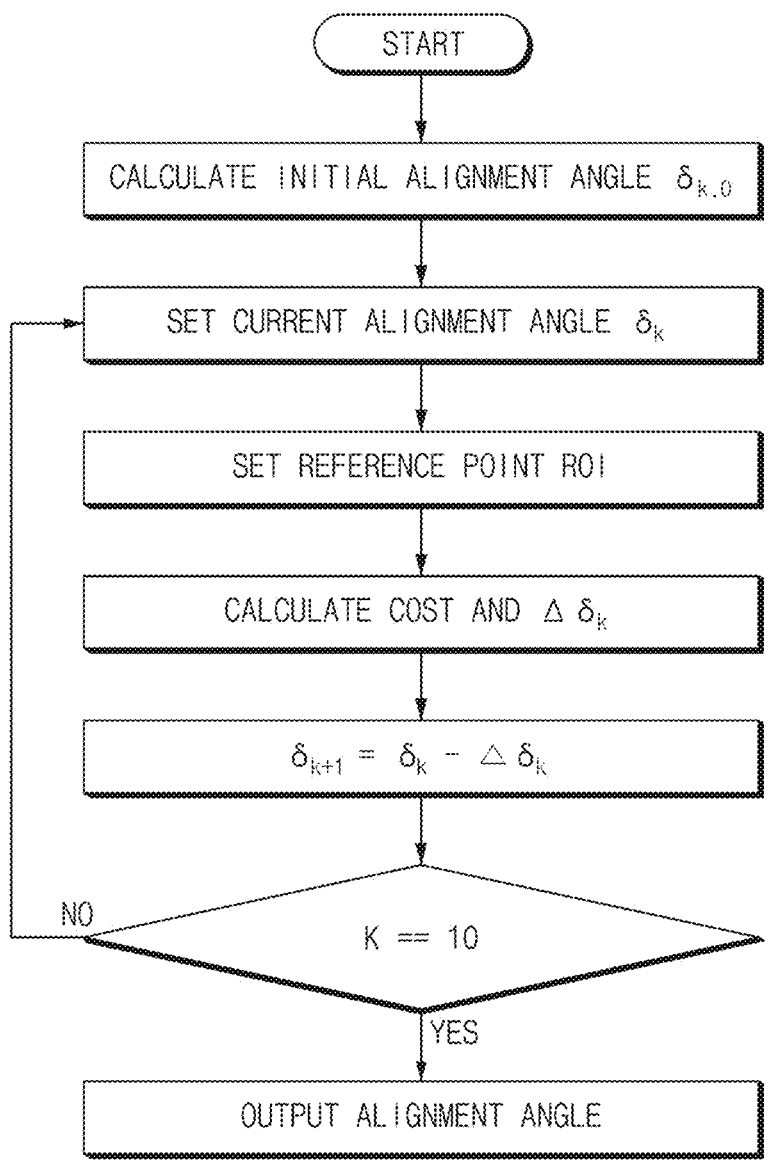
FIG. 14 is a flowchart illustrating a calculation process for calculating an alignment angle according to an embodiment of the present disclosure.
Figure 15A:
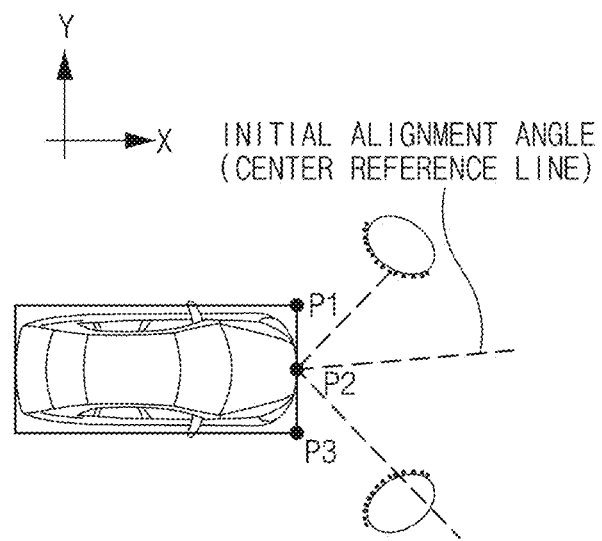
FIGS. 15A and 15B are drawings illustrating setting an initial alignment angle for calculating an alignment angle and an avoidance direction ROI and calculating the amount of change in alignment angle according to an embodiment of the present disclosure.
Figure 15B:
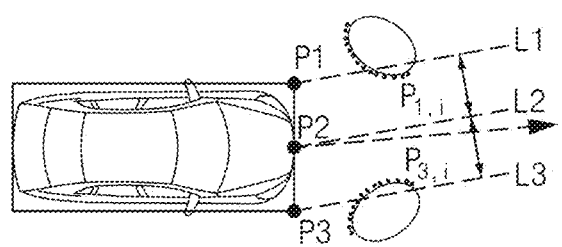
Figure 16A:
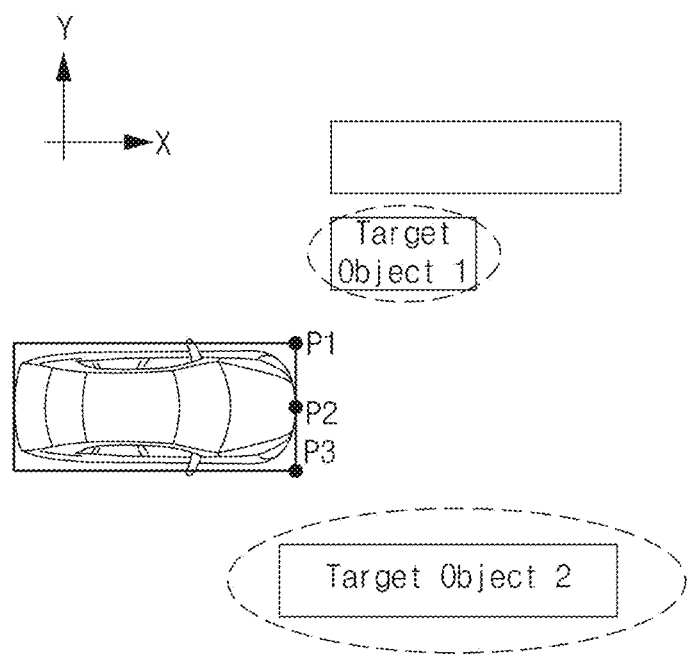
FIGS. 16A and 16B are drawings illustrating selecting a target object around a vehicle, which enters a parking space according to an embodiment of the present disclosure.
Figure 16B:
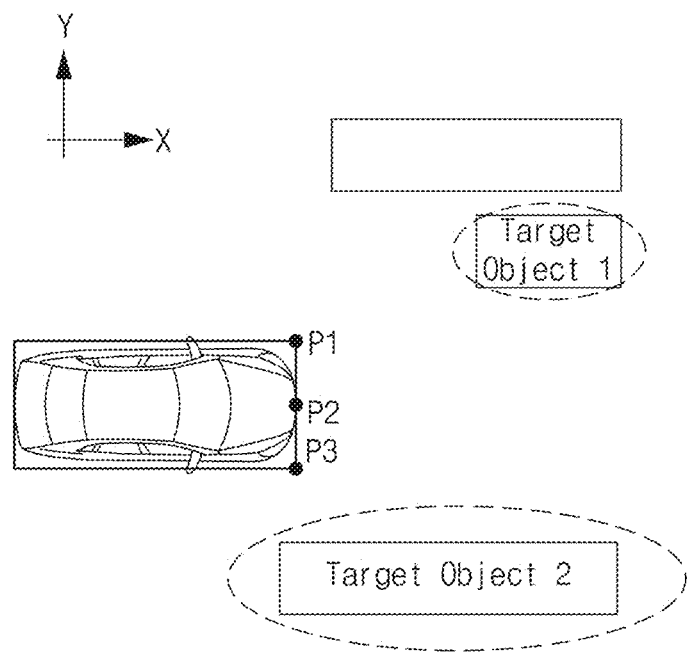
Figure 17:
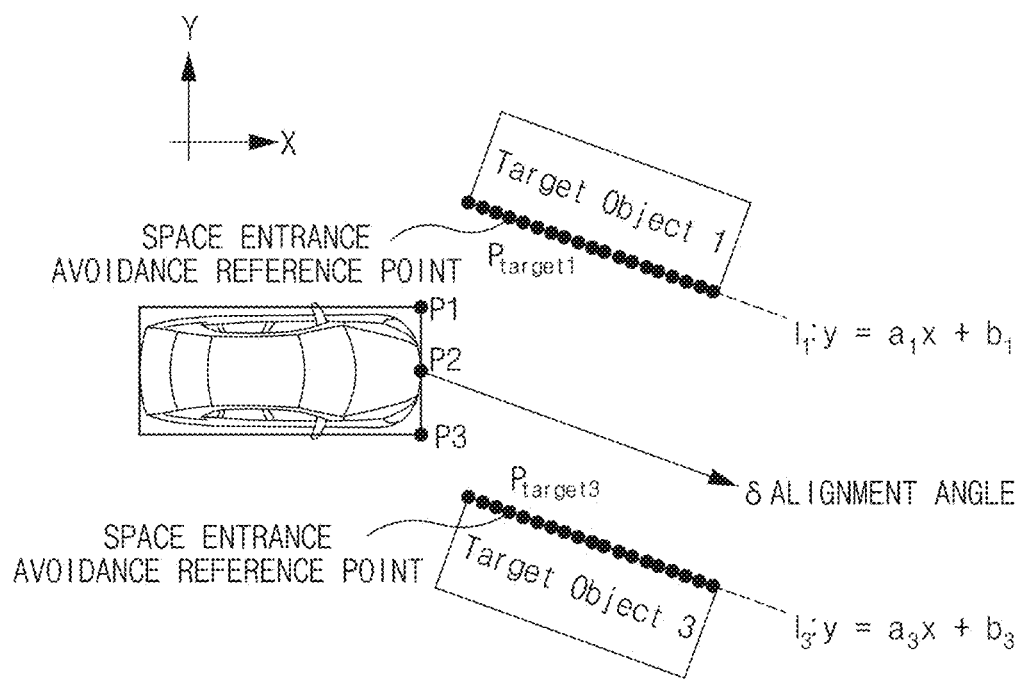
FIG. 17 is a drawing illustrating calculating an avoidance reference line indicating distribution of points after a space entrance avoidance reference point and proceeding with parking depending on an alignment angle according to the avoidance reference line according to an embodiment of the present disclosure.
Figure 18:
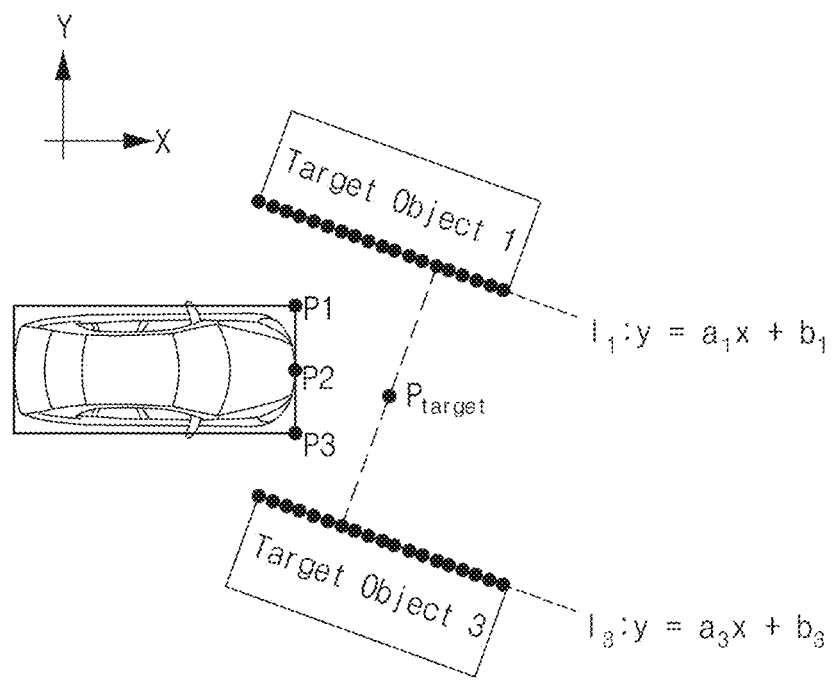
FIG. 18 is a drawing illustrating an alignment target point guiding a vehicle to enter a parking space according to an embodiment of the present disclosure.

FIG. 1 is a block diagram illustrating a configuration of a parking assist system with improved avoidance steering control according to an embodiment of the present disclosure. FIGS. 2A and 2B are drawings illustrating that a field of view (FOV) is increased upon avoidance steering control according to an embodiment of the present disclosure. FIGS. 3A and 3B are drawings illustrating FOVs of front- and rear-view image data and side-view image data, which are captured by a surround view monitor (SVM camera), according to an embodiment of the present disclosure. FIG. 4 is a flowchart illustrating a process of detecting and clustering an object using an image indicated on image data according to an embodiment of the present disclosure. FIGS. 5A and 5B are drawings illustrating detecting an object using an image included in front- and rear-view image data and side-view image data of a vehicle according to an embodiment of the present disclosure. FIGS. 6A and 6B are drawings illustrating that a boundary object image indicated on a region of interest (ROI) is detected from front- and rear-view image data and side-view image data according to an embodiment of the present disclosure. FIG. 7 is a drawing illustrating comparing distances between a first centroid and a second centroid and specifying a boundary object according to an embodiment of the present disclosure. FIGS. 8A, 8B, and 8C are drawings illustrating matching and storing coordinates of an object on a local coordinate system in the center of a vehicle according to an embodiment of the present disclosure. FIG. 9 is a drawing illustrating correcting a position of an object by sensing data (TOF) according to an embodiment of the present disclosure. FIG. 10 is a drawing illustrating correcting a position of an object when several sensing data are received for one object according to an embodiment of the present disclosure. FIG. 11 is a drawing illustrating selecting a reference point ROI and an avoidance reference point according to an embodiment of the present disclosure. FIGS. 12A, 12B, 12C, and 12D are drawings illustrating a change in weight coefficient according to a change in x-axis distance between a vehicle and an object according to an embodiment of the present disclosure. FIG. 13 is a graph illustrating an example of setting a tuning parameter for calculating a cost according to an embodiment of the present disclosure. FIG. 14 is a flowchart illustrating a calculation process for calculating an alignment angle according to an embodiment of the present disclosure. FIGS. 15A and 15B are drawings illustrating setting an initial alignment angle for calculating an alignment angle and an avoidance direction ROI and calculating the amount of change in alignment angle according to an embodiment of the present disclosure. FIGS. 16A and 16B are drawings illustrating selecting a target object around a vehicle, which enters a parking space according to an embodiment of the present disclosure. FIG. 17 is a drawing illustrating calculating an avoidance reference line indicating distribution of points after a space entrance avoidance reference point and proceeding with parking depending on an alignment angle according to the avoidance reference line according to an embodiment of the present disclosure. FIG. 18 is a drawing illustrating an alignment target point guiding a vehicle to enter a parking space according to an embodiment of the present disclosure.

Referring to FIG. 1, the parking assist system with the improved avoidance steering control according to an embodiment of the present disclosure may include a sensor module 100 for sensing a distance from a vehicle to an object using sensing data obtained by scanning the periphery of the vehicle. The parking assist system may also include a surround view monitor (SVM) camera 200 for capturing an image around the vehicle to obtain image data capable of detecting a position and a direction of the object. The parking assist system may also include a sensor fusion calculation module 300 for fusing the sensing data of the sensor module 100 and the image data of the SVM camera 200 to calculate position information of the object with respect to a current position of the vehicle. The parking assist system may also include parking assist module 400 for avoiding the object based on the position information and performing steering control of the vehicle for autonomous parking.

Furthermore, the parking assist system with the improved avoidance steering control according to an embodiment of the present disclosure may further include an object map 360 for matching the position information of the object, which is calculated by the sensor fusion calculation module 300, with a cell, which partitions the periphery of the vehicle. The object map 360 is also used for assigning and storing coordinates for each point indicating the outside of the object.

In this case, the sensor module 100 may be composed of various sensors capable of identifying presence or absence of the object around the vehicle, a position of the object, and a distance to the object. Hereinafter, an embodiment in which the sensor module 100 is composed of an ultrasonic sensor widely used in a general parking assist system is described. However, it is apparent that the sensor module 100 may be implemented with various sensors except for the ultrasonic sensor. Thus, the ultrasonic sensor is described using the same reference numeral as the sensor module.

The ultrasonic sensor 100 may receive a time of flight (TOF) and a direction where an ultrasonic wave emitted to the periphery of the vehicle is reflected and returned from objects including a stopped surrounding vehicle and may sense a direction where the object is located with respect to the vehicle and a distance to the object.

The ultrasonic sensor 100 is used to scan a parking space and sense an object for avoidance steering in a general parking assist system. However, because the ultrasonic sensor 100 has a limited field of view (FOV), it is difficult to determine a control reference point for an object, which is present over the FOV.

In other words, the general parking assist system has an inner sensor for sensing a central portion in front of the vehicle and an outer sensor for sensing both side portions in front of the vehicle. A control reference point is determined by means of an intersection point sensed by both the inner sensor and the outer sensor.

Thus, as shown in FIG. 2A, because an object is sensed by both the inner sensor and the outer sensor in a left direction of the vehicle, a control reference point may be derived. However, because the object is sensed by only the outer sensor and is not sensed by the inner sensor in a right direction of the vehicle, an intersection point is not derived and a control reference point is not determined due to it.

Thus, as shown in FIG. 2B, an embodiment of the present disclosure may fuse the image data obtained from the SVM camera 200 with the sensing data sensed by the ultrasonic sensor 100 and thus may accurately detect an object on a position departing from an FOV of the inner sensor.

In other words, as the object is able to be sensed by the image data of the SVM camera 200, which is a bit lower in distance accuracy than the ultrasonic sensor 100 but has a wider FOV than the ultrasonic sensor 100 and more accurately provides information about a direction where there is an object than the ultrasonic sensor 100, the limit of the ultrasonic sensor 100 may be compensated.

To this end, the SVM camera 200 may capture front- and rear-view images and both side-view images of the vehicle to obtain image data capable of identifying presence or absence of the object and information about a direction where the object is located.

Thus, as shown in FIG. 2B, although there is an object on a position departing from the FOV of the inner sensor, a control reference point for avoidance steering of the vehicle may be derived by a position of the object on the image data obtained by the SVM camera 200 and location and distance information of the object on the sensing data obtained by the ultrasonic sensor 100.

Furthermore, the fusion calculation module 300 may include a cell setting device 310 for dividing a region around the vehicle on the image data obtained from the SVM camera 200 into cells, each of which has a certain interval, and assigning an address to each cell. The fusion calculation module 300 may also include an object detecting device 320 for detecting presence or absence of the object based on the image data and classifying a type of the detected object to detect the object in a parking area. The fusion calculation module 300 may also include an object map generator 340 for matching and storing a cell address of a position where the object is recognized on the image data with classification information of the object to generate an object map indicating an object distribution situation for the parking area.

In this case, as shown in FIG. 3A, the cell setting device 310 may divide each of a forward region and a rearward region of the vehicle indicated on the image data captured by the SVM camera 200 into a plurality of cells divided at an even interval and may assign addresses to the respective cells like cell 1 to cell 30. In this case, the cell setting device 310 may separately assign addresses to each of the forward region and the rearward region of the vehicle, which are captured by the SVM camera 200.

Furthermore, as shown in FIG. 3B, the cell setting device 310 may divide each of both sideward regions of the vehicle, which are captured by the SVM camera 200, into a plurality of cells divided at an even interval and may assign addresses like cell 1 to cell 60.

In this case, in FIGS. 3A and 3B, it is shown that each of the forward region and the rearward region are divided into 30 cells and that each of both sideward areas is divided into 60 cells. However, it is apparent that it is able to differently set the number of cells dividing each region.

Furthermore, the object detecting device 320 may identify presence or absence of objects including a parked vehicle indicated on the image data obtained by the SVM camera 200 and may compare a type of the detected object with an appearance of an object on an object classification table 321 previously stored to detect the object.

To this end, the object classification table 321 may classify products capable of being captured on image data in a parking area, including a free space in which an object is not detected, a background, a car, a pillar, a curb, and a pedestrian, and may assign and store a certain object classification code (e.g., an index) to each of the classified products.

The object detecting device 320 may compare an image of the object indicated on the image data with product information stored in the object classification table 321 and may match and store an object classification code to the image of the object.

In this case, the object detecting device 320 may detect whether there is an image capable of being detected as an object for each cell divided by the cell setting device 310 and whether the image which is present is a certain object. The object detecting device 320 may also store coordinates of respective points where the object is detected on a local coordinate system with respect to the vehicle as position information. The object detecting device 320 may match and store an object classification code assigned to an image of the object recognized for each cell to a point of each object.

Thus, the object detecting device 320 may cluster cells to which the object classification codes are matched and may detect a region occupied by the object. To this end, when the same object classification code is matched to adjacent cells, the object detecting device 320 may detect objects as the same object.

In other words, as shown in FIG. 4, the object detecting device 320 may determine whether there is an object classification code matched to an ith cell. The object detecting device 320 may also compare an object classification code matched to a current cell with an object classification code matched to a previous cell. The object detecting device 320 may also determine images of the object as images of the same object, when the object classification codes of the two cells are identical to each other. The object detecting device 320 may also end the determination of the same object, when there is no object classification code or when the object classification codes of the two cells are different from each other. Thus, the object detecting device 320 may form a cluster of points indicating the same object among object images detected from respective cells.

Furthermore, after the determination of the ith cell is ended, while repeating the same process for an i+1th cell, which is a next cell, the object detecting device 320 may determine whether there is an object detected on the image data by means of an analysis of all cells making up the image data.

In this case, it is apparent that the process of determining whether there is an object classification code in the i+1th cell, which is the next cell, may be repeatedly executed, when there is no object classification code matched to the ith cell.

As such, the object detecting device 320 may analyze the image data captured by the SVM camera 200 and may determine whether an object classification code is matched to each cell and whether the object classification codes are identical to each other or are different from each other. Thus, an object, which is present around the vehicle, may be detected.

Thus, as shown in FIG. 5A, the object detecting device 320 may detect object 1 Obj 1 located in front of the vehicle and object 2 Obj 2 located on the front-right of the vehicle from the front- and rear-view image data of the vehicle. Furthermore, as shown in FIG. 5B, the object detecting device 320 may detect object 3 Obj 3 located at the left side of the vehicle and object 2 Obj 2 located on the right front of the vehicle from the both side-view image data of the vehicle.

In this case, because object 2 Obj 2 are detected from both the front-view image data and the side-view image, the object detecting device 320 should determine whether the detected result indicates the same object or a separate object.

To this end, the sensor fusion calculation module 300 may further include a boundary object specifying device 330 for determining whether a boundary object detected on a region of interest (ROI) where the front- and rear-view image data and the both side-view image data are overlapped is identical to any of objects detected from at least one of the front- and rear-view image data or the side-view image data. The boundary object specifying device 330 is also used for specifying the object.

In other words, the boundary object specifying device 330 is to specify the same object among objects repeatedly detected from the front- and rear-view image data and the side-view image data as one object.

As such, to separately describe an object detected on the ROI and an object detected from the front- and rear-view image data or the side-view image data, the object on the ROI is represented as a 'boundary object' before specifying the object and is represented as an 'object' in the same manner as another object after specifying the object.

The boundary object specifying device 330 may calculate a first centroid of a boundary object image detected from the front- and rear-view image data and a second centroid of a boundary object image detected on the side-view image data. The boundary object specifying device 330 may also determine a boundary object, which has the minimum distance between the first centroid and the second centroid calculated for boundary objects to which the same object classification code is matched, as the same object.

To this end, as shown in FIGS. 6A and 6B, the boundary object specifying device 330 may set each of a front-right region, a front-left region, a rear-right region, and a rear-left region of the vehicle as an ROI (which is represented by a dotted rectangle in FIGS. 6A and 6B) and may select an object detected on the ROI as a boundary object. In FIGS. 6A and 6B, it is shown that a boundary object of a circular image is selected as a first boundary object and a boundary object of a rectangular image is selected as a second boundary object.

After the boundary object on the ROI is selected, the boundary object specifying device 330 may calculate the first centroid using point coordinates of a boundary object detected from the front- and rear-view image data. The boundary object specifying device 330 may also calculate the second centroid using point coordinates of a boundary object detected from the side-view image data. Accordingly, when only a portion of the boundary object is detected, the boundary object specifying device 330 may calculate a centroid of only the recognized points.

Accordingly, as shown in FIG. 6A where the ROI is overlapped and displayed on the front- and rear-view image data, the boundary object specifying device 330 may calculate a first centroid ($x_c$, $y_c$) for position information of points (displayed by circular points) where the first boundary object is detected from the front- and rear-view image data like Equation 1 below.

$$x_c = \frac{1}{N}\sum_i x_i, \; y_c = \frac{1}{N}\sum_i y_i \qquad \text{[Equation 1]}$$

In FIG. 6A, the position of the first centroid for the first boundary object is represented as alphabet X and is denoted as $P_{1,f}$. Furthermore, the position of the first centroid for the second boundary object is represented as alphabet X and is denoted as $P_{2,f}$.

Furthermore, as shown in FIG. 6B where the ROI is overlapped and displayed on the side-view image data, the boundary object specifying device 330 may calculate a second centroid ($x_c$, $y_c$) for position information of points (displayed by diamond-shaped points) where the first boundary object is detected from the both side-view image data like Equation 1 above.

In FIG. 6B, the position of the second centroid for the first boundary object is represented as alphabet X and is denoted as $P_{1,s}$. Furthermore, the position of the second centroid for the second boundary object is represented as alphabet X and is denoted as $P_{2,s}$.

As such, after calculating the first centroid ($P_{1,f}$, $P_{2,f}$) and the second centroid ($P_{1,s}$, $P_{2,s}$) for the respective boundary objects, the boundary object specifying device 330 may select boundary objects, to which the same object classification code is matched between the boundary object on the front- and rear-view image data and the boundary object on the both side-view image data in each ROI, as comparison targets.

Thereafter, like Equation 2 below, the boundary object specifying device 330 may calculate a distance between the first centroid and the second centroid calculated for the respective boundary objects selected as the comparison targets by means of a Euclidean norm and may determine two boundary objects having a minimum distance as the same object.

$$\min_j \|P_{1,f} - P_{1,s}\|_2 \qquad \text{[Equation 2]}$$

Accordingly, as shown in FIG. 7, because there is a minimum distance between the first centroid $P_{1,f}$ calculated from the front- and rear-view image and the second centroid calculated from the side-view image data with respect to the first boundary object, the boundary object specifying device 330 may determine that the first boundary object is the same object. Furthermore, because there is a minimum distance between the first centroid $P_{2,f}$ and the second centroid $P_{2,s}$ with respect to the second boundary object, the boundary object specifying device 330 may determine that the second boundary object is the same object.

Furthermore, the object map generator 340 may map and store object detection information obtained from the image data of the SVM camera 200 with coordinates of position information where each object is detected on the basis of the position of the vehicle. Thus, the object map 360 indicating an object distribution situation for a parking area to perform autonomous parking may be generated.

Accordingly, as shown in FIGS. 8A and 8B, the object map generator 340 may store object information (including an obstacle classification code and an appearance image)

detected by the object detecting device 320 based on the front- and rear-view image data and the side-view image data on the object map 360 with respect to the current position of the vehicle.

In this case, for object 2 Obj 2 on the ROI capable of being detected from all the front- and rear-view image data and the both side-view image data, the boundary object specifying device 330 may specify that the boundary object detected in FIG. 8A and the boundary object detected in FIG. 8B are object 2 Obj 2, which is the same object.

As a result, as shown in FIG. 8C, information indicating that object 1 Obj 1 capable of being obtained from only front- and rear-view image data is located in front of the vehicle, information indicating that object 3 Obj 3 capable of being obtained from only both side-view image data is located at the left side of the vehicle, and information indicating that object 2 Obj 2 detected on the ROI is located at the right front of the vehicle may be stored on the object map 360.

In this case, as shown in FIG. 8C, as the object detection information obtained from the front- and rear-view image data of the vehicle is displayed using circular points and the object detection information obtained from the both side-view image data is displayed using diamond-shaped points, visual classification convenience is provided.

Furthermore, the sensor fusion calculation module 300 may further include an object position correcting device 350 for correcting and storing the position of the object set on the object map 360 based on the sensing data of the ultrasonic sensor 100.

The object position correcting device 350 may select a point of the object closest to the ultrasonic sensor 100 as reference coordinates. The object position correcting device 350 may also move the reference coordinates in parallel until meeting a circle and may set the moved reference coordinates to correction coordinates of the object, until meeting a circle, which is around the ultrasonic sensor 100 and has a return path of sensing data (e.g., a TOF) for the reference coordinates as a radius. The object position correcting device 350 may also move coordinates of the other points of the object in parallel in the same manner along the direction where the reference coordinates move to the correction coordinates to correct the position of the object.

In this case, the object position correcting device 350 may set coordinates of the object closest to the ultrasonic sensor 100. For example, as shown in FIG. 9 and Equation 3 below, coordinates $P_{j,obj}$ may be matched to a point of the object where the ultrasonic sensor 100 measures the shortest sensing data (e.g., the shortest TOF) as the reference coordinates. Furthermore, the reference coordinates may be set on a region which does not depart from a field of view (FOV) of the ultrasonic sensor 100.

$$\min_{j} |\|P_{USS} - P_{j,obj}\|_2 - TOF| \quad [\text{Equation 3}]$$

In this case, Pass denotes the position of the ultrasonic sensor (USS) 100 provided in the vehicle, $P_{j,obj}$ denotes the reference coordinates as the coordinates of the object detected on the jth cell among images of the object detected from the image data, and the TOF denotes a time of flight of the ultrasonic wave which is emitted from the ultrasonic sensor 100 and is reflected against the object.

The object position correcting device 350 may move the reference coordinates $P_{j,obj}$ in parallel to a position sensed by the ultrasonic sensor 100 to set the reference coordinates $P_{j,obj}$ to the correction coordinates. To this end, the object position correcting device 350 may set a circle, which has a distance from the position $P_{USS}$ where the ultrasonic sensor 100 is installed to the position of the object where the sensing data (e.g., the TOF) is reflected as a radius. The object position correcting device 350 may also move the reference coordinates in parallel along the $\overrightarrow{P_{j,obj}P_{CAM}}$ vector direction, which is toward a position $P_{CAM}$ where the SVM camera 200 is installed from the current coordinates $P_{j,obj}$ to set correction coordinates $P'_{j,obj}$.

Thereafter, the object position correcting device 350 may move coordinates indicating the object, which are stored in the object map 360, in parallel in the same manner along the $\overrightarrow{P_{j,obj}P'_{j,obj}}$ vector direction where the reference coordinates $P_{j,obj}$ to the correction coordinates $P'_{j,obj}$ to correct the position of the object.

Accordingly, the object position correcting device 350 may move the reference coordinates of the object closest to the ultrasonic sensor 100 among coordinates of the object obtained based on the image data in the direction facing the SVM camera 200 provided in the vehicle. The object position correcting device 350 may also move the other coordinates of the object in parallel along the direction where the reference coordinates are moved. Thus, the image of the object from being distorted in the correction process may be prevented.

In this case, as shown in FIG. 9, when only one sensing data (e.g., one TOF) is received for one object (i.e., when the sensing data (e.g., the TOF) is sensed by the outer ultrasonic sensor, but is not sensed by the inner ultrasonic sensor), as described above, the object position correcting device 350 may set coordinates of a point having a TOF with the shortest value of the sensing data to the reference coordinates.

However, as shown in FIG. 10, when several sensing data (e.g., several TOFs) are received for one object (i.e., when sensing data are received from both the outer ultrasonic sensor and the inner ultrasonic sensor), the object position correcting device 350 may correct the position of the object using each sensing data (e.g., each TOF) and may calculate an average of the coordinates indicating the corrected position of the object like Equation 4 below. Thus, the calculated average to a final position of the object may be corrected. In this case, N is the total number of sensing data (e.g., TOFs) received for one object.

$$\overrightarrow{P_{j,obj}P'_{j,obj}} = \frac{1}{N}\sum_{k} \overrightarrow{P_{j,obj}P'_{j,obj_k}} \quad [\text{Equation 4}]$$

In FIG. 10, the reference coordinates set by the sensing data (e.g., the TOF) received by the outer ultrasonic sensor $P_{USS1}$ is denoted as $P_{j,obj1}$, and the reference coordinates set by the sensing data (e.g., the TOF) received by the inner ultrasonic sensor $P_{USS2}$ is denoted as $P_{j,obj2}$.

It is shown that the correction coordinates moved in parallel in a vector direction facing the position $P_{CAM}$ where the SVM camera 200 is installed from the two reference coordinates $P_{j,obj1}$ and $P_{j,obj2}$. As such, as described above, the other coordinates of the object may be moved in parallel along the vector direction facing each correction coordinates from each reference coordinates and the average of the results may be set to the final correction position of the object.

Furthermore, the parking assist module 400 may include an avoidance reference point determining device 410 for selecting a point of the object the vehicle should avoid when the vehicle enters the parking space as an avoidance reference point based on coordinates indicating the point of the object stored in the object map 360. The parking assist module 400 may also include an alignment angle calculating device 430 for calculating an alignment angle at which the vehicle should be aligned such that the vehicle entering the parking space may avoid the object to park.

The avoid reference point determining device 410 may set a vehicle portion, which should avoid a contact with an object adjacent to the vehicle when the vehicle enters the parking space to a vehicle reference point. The avoid reference point determining device 410 may also select coordinates of the object, having the minimum distance from the vehicle reference point, among object points stored on the obstacle map 360, as an avoidance reference point.

To this end, as shown in FIG. 11, the avoid reference point determining device 410 may set the left end of the bumper of the vehicle to a first vehicle reference point P1, may set the central end of the bumper of the vehicle to a second vehicle reference point P2, and may set the right end of the bumper of the vehicle to a third vehicle reference point P3. In this case, the vehicle reference point may be set with respect to the front bumper of the vehicle for head-on parking, but the vehicle reference point may be set with respect to the rear bumper of the vehicle for reverse parking.

Furthermore, the avoid reference point determining device 410 may separately set a +y-axis direction at one side and a −y-axis direction of the other side to a first reference point ROI and a second reference point ROI, respectively, with respect to an x-axis on the local coordinate system with respect to the center of the vehicle. The first reference point ROI and the second reference point ROI are regions for selecting an avoidance reference point, which should avoid contacts with objects at the left and right sides of the vehicle, from coordinates of each object.

The avoid reference point determining device 410 may select a point, having the minimum distance from the vehicle reference point, among object points on each ROI as an avoidance reference point on each reference point ROI.

To this end, the avoid reference point determining device 410 may calculate a distance between the vehicle reference point and the object point on each reference point ROI using a cost function like Equation 5 below and may select a point with the minimum distance as an avoidance reference point.

$$\min_i \sqrt{\alpha(x_{P_{base}} - x_{P_i})^2 + (1-\alpha)(y_{P_{base}} - y_{P_i})^2}, (0 \le \alpha \le 1) \quad \text{[Equation 5]}$$

In Equation 5 above, α denotes the weighting factor. Because the closer α is to "0", the smaller the item of the x-axis coordinates, a weight is assigned to a y-axis direction. Because the closer α is to "1", the smaller the item of the y-axis coordinates, a weight is assigned to an x-axis direction. In this case, $(x_{P_{base}}, y_{P_{base}})$ is coordinates of the vehicle reference point on the local coordinate system with respect to the center of the vehicle, and $(x_{P_i}, y_{P_i})$ is coordinates of each point for the object stored on the object map 360.

Accordingly, when $P_{base}$ is the first vehicle reference point P1, the avoidance reference point selected by Equation 5 above may become a first avoidance reference point $P_{y+}$ in the +y-axis direction on the first reference point ROI. When $P_{base}$ is the third vehicle reference point P3, the avoidance reference point selected by Equation 5 above may become a second avoidance reference point $P_{y-}$ in the −y-axis direction on the second reference point ROI. In FIG. 11, as the selected avoidance reference point is displayed using a circle with an empty inside, it may be distinguished from coordinates of other points of the object, which do not become the avoidance reference point at the current position of the vehicle.

Furthermore, the parking assist module 400 may further include a weight varying device 420 for increasing a weight in the y-axis direction, as a distance between from the vehicle to the object decreases to apply the weighting factor applied in selecting the avoidance reference point at the avoid reference point determining device 410 to the increased weight.

Figure 12D:
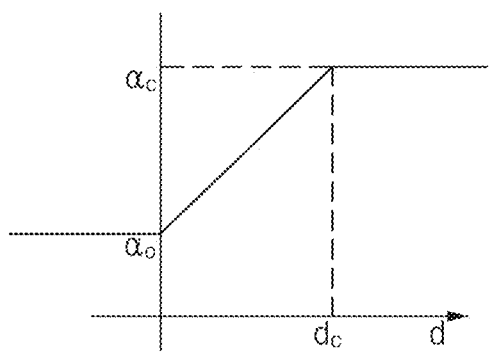

Accordingly, as shown in FIG. 12D, the weight varying device 420 may apply a weighting factor α to a maximum value $α_c$, when the x-axis distance between the vehicle and the object is more distant than a certain reference distance $d_c$. The weight varying device 420 may also apply the weighting factor α to a minimum value $α_0$, when the x-axis distance between the vehicle and the object is closer than the reference distance $d_c$. Thus, the avoidance reference point may be determined using the cost function such as Equation 5 above. In this case, the reference distance $d_c$, the minimum value $α_0$ of the weighting factor, and the maximum value $α_c$ of the weighting factor are adjustable parameters.

Due to this, as shown in FIGS. 12A, 12B, and 12C, a point on coordinates where the x-axis distance from the vehicle reference point is close may have a higher weight to be selected as an avoidance reference point, when the x-axis distance d between the vehicle and the object is greater than the reference distance $d_c$. However, a point on coordinates where the y-axis distance rather than the x-axis direction is close may have a higher weight to be selected as an avoidance reference point, when the x-axis distance d between the vehicle and the object is less than the reference distance $d_c$.

As such, the weight varying device 420 may increase a weight in the y-axis direction for alignment and separation control of the vehicle, which enters a parking space between objects as the distance between the vehicle and the object decreases. Thus, performance of avoiding a collision with the object may be improved.

Furthermore, the alignment angle calculating device 430 may calculate an average of angles defined by the second vehicle reference point set on the front center of the vehicle and the avoidance reference point as an initial alignment angle at which the vehicle enters the parking space while avoiding the object. The alignment angle calculating device 430 may also calculate the amount of change in alignment angle, which should increase and decrease for avoidance steering depending on a degree to which the vehicle enters the parking space. Thus, the calculated initial alignment angle and the calculated amount of change in alignment angle may be provided as data for avoidance steering control of the vehicle.

When the vehicle enters the parking space, as shown in FIG. 15A, the alignment angle calculating device 430 may calculate an average of angles, defined by the second vehicle reference point set on the front center of the vehicle and a first avoidance reference point (displayed using a circle, the inside of which is empty) selected from an object located at the left side of the vehicle and a second avoidance reference point (displayed using a circle, the inside of which is empty) selected from an object located at the right side of the vehicle, as an initial alignment angle $δ_k$.

As shown in FIG. 15A, the calculated initial alignment angle may be a rotational angle from the x-axis on the local coordinate system with respect to the center of the vehicle, which may be a current steering angle of the vehicle entering the parking space.

As shown in FIG. 15B, the alignment angle calculating device 430 may set an avoidance direction ROI using first and second avoidance reference lines, which are straight lines $l_1$ and $l_3$, which are parallel to the center reference line being a straight line indicating the current initial alignment angle $\delta_k$ and pass through the respective avoidance reference points.

Accordingly, the alignment angle calculating device 430 may set a region between the first avoidance reference line passing through a first avoidance point and the center reference line to a first avoidance direction ROI. The alignment angle calculating device 430 may also set a region between the second avoidance reference line passing through a second avoidance point and the center reference line to a second avoidance direction ROI.

The alignment angle calculating device 430 may obtain the sum of distances between points of the object in the first avoidance direction ROI and the first avoidance reference line and the sum of distances between points of objects in the second avoidance direction ROI and the second avoidance reference line using an Euclidean norm like Equation 6 above to calculate a difference between the two sum of the distances as a cost. The alignment angle calculating device 430 may calculate the amount of change in alignment angle for correcting the initial alignment angle such that such a cost becomes minimal.

$$\text{cost} = \Sigma_j \|l_2 - P_{3,j}\|_2 - \Sigma_i \|l_k - P_{1,i}\|_2 \quad \text{[Equation 6]}$$

In this case, in Equation 6, $P_{1,i}$ denotes the coordinates of object points in the first avoidance direction ROI between the first return reference line and the center reference line, and $P_{3,j}$ denotes the coordinates of object points in the second avoidance direction ROI between the second return reference line and the center reference line.

Furthermore, the alignment angle calculating device 430 may calculate the amount $\Delta\delta_k$ of change in alignment angle using a proportional relationship indicated on the graph shown in FIG. 13 to quicken a speed where the cost calculated by Equation 6 above converges.

Accordingly, as the vehicle enters the parking space, the first avoidance reference point and the second avoidance reference point are varied. As the first avoidance direction ROI and the second avoidance direction ROI are varied due to this, the points of the object in each avoidance direction ROI are varied. As such, because the amount of change in alignment angle calculated by Equation 6 above is varied as the points of the object in each avoidance direction ROI are varied, the alignment angle calculating device 430 may perform steering control according to an alignment angle required for avoidance control of the object in the changed position.

In this case, "a" and "b" indicated on the graph of FIG. 13 are tuning parameters, which may be differently set according to a convergence speed and a convergence degree to be implemented in calculating the amount of change in alignment at the alignment angle calculating device 430. In other words, to quickly implement a convergence speed, the alignment angle calculating device 430 may increase a value of "b" and may calculate the amount of change in alignment angle to be large although there is a small change in cost. To accurately control a convergence degree, the alignment angle calculating device 430 may increase a value of "a" and may calculate the precise amount of change in alignment angle depending on a change in cost.

After calculating the amount of change in alignment angle as described above, like Equation 7 below, the alignment angle calculating device 430 may reflect the amount of change in alignment angle in an existing alignment angle to calculate a current alignment angle. Accordingly, the alignment angle calculating device 430 may continue calculating the current alignment angle in which the amount of change in alignment angle calculated while the vehicle enters the parking space is reflected, from the initial alignment angle initially calculated when the vehicle starts to enter the parking space.

$$\delta_{k+1} = \delta_k - \Delta\delta_k \quad \text{[Equation 7]}$$

To improve accuracy of calculating the cost and calculating the amount $\Delta\delta_k$ of change in alignment angle, the alignment angle calculating device 430 may repeat the process of calculating the amount of change in alignment angle from the current alignment angle $\delta_k$ to calculate a new alignment angle a predetermined number of times (where the number of times K of iterative calculation is set to 10 times in FIG. 14) and may output the result.

Furthermore, when sensing data (e.g., a TOF) continues being received over a certain number of times (e.g., 5 times) from a side ultrasonic sensor provided in the vehicle, the alignment angle calculating device 430 may determine that the vehicle enters a parking space between objects (e.g., vehicles which are parking, pillars of a parking lot, or wall surfaces of the parking lot).

As such, after it is determined that the vehicle enters the parking space, the alignment angle calculating device 430 may select an object, to which an avoidance reference point on a $$\begin{pmatrix} x_1 & 1 \\ \vdots & \vdots \\ x_n & 1 \end{pmatrix} \begin{pmatrix} a \\ b \end{pmatrix} = \begin{pmatrix} y_1 \\ \vdots \\ y_n \end{pmatrix}$$

y-axis direction (i.e., at the left side of the vehicle in FIG. 16) and an avoidance reference point on a region of the −y-axis direction (i.e., at the right side of the vehicle) belong, as a target object.

In this case, the target object may be selected as an object with the nearest distance in the y-axis direction among objects, which are present on each of the first avoidance direction ROI and the second avoidance direction ROI.

Because the alignment angle calculating device 430 should align the vehicle in the parking space between objects for safe parking after the vehicle enters the parking space, it may select an avoidance reference point determined when the vehicle enters the parking space as a space entrance avoidance reference point $P_{trgt1}$ or $P_{trgt3}$.

In this case, the alignment angle calculating device 430 may calculate a new avoidance reference line 11 or 13 representing coordinates of points, each of which has a larger x-axis coordinate value than the x coordinate of the space entrance avoidance reference point $P_{trgt1}$ or $P_{trgt3}$ among points of the target object using a least square method like Equation 8 below.

$$\begin{pmatrix} x_1 & 1 \\ \vdots & \vdots \\ x_n & 1 \end{pmatrix} \begin{pmatrix} a \\ b \end{pmatrix} = \begin{pmatrix} y_1 \\ \vdots \\ y_n \end{pmatrix} \quad \text{[Equation 8]}$$

-continued $$Ax = b$$
$$x = (A^T A)^{-1} A^T b$$

Accordingly, as shown in FIG. 17, the alignment angle calculating device 430 may calculate the avoidance reference lines $I_1$ ($y=a_1x+b_1$) and $I_3$ ($y=a_3x+b_3$) using Equation 8 above. Thereafter, the alignment angle calculating device 430 may calculate a new alignment angle $\delta$ guided not to be adjacent to points of the object including the space entrance avoidance reference point like Equation 9 below, using an average of slopes of two straight lines. The alignment angle calculating device 430 may also perform steering control of the vehicle depending to such an alignment angle. Thus, avoidance steering of objects to perform autonomous parking may be performed.

Furthermore, the parking assist module 400 may further include an alignment target point calculating device 440 for calculating an alignment target point for guiding the vehicle, which enters the parking space, to complete parking using Equation 9 above and providing the alignment target point as a guidance point for completing parking.

$$P_{target} = \left( \frac{x_{P_{y+}} + x_{P_{y-}}}{2}, \frac{a_1 x_{P_{y+}} + b_1 + a_3 x_{P_{y-}} + b_3}{2} \right) \quad \text{[Equation 9]}$$

To this end, as shown in FIG. 18 and Equation 9 above, the alignment target point calculating device 440 may calculate and provide coordinates of a position corresponding to an average of an x-axis value and a y-axis value of the first avoidance reference point $P_{y+}$ and the second avoidance reference point $P_{y+}$ selected by the alignment angle calculating device 430 after the vehicle enters the parking space as an alignment target point on which the vehicle stops.

Figure 19:
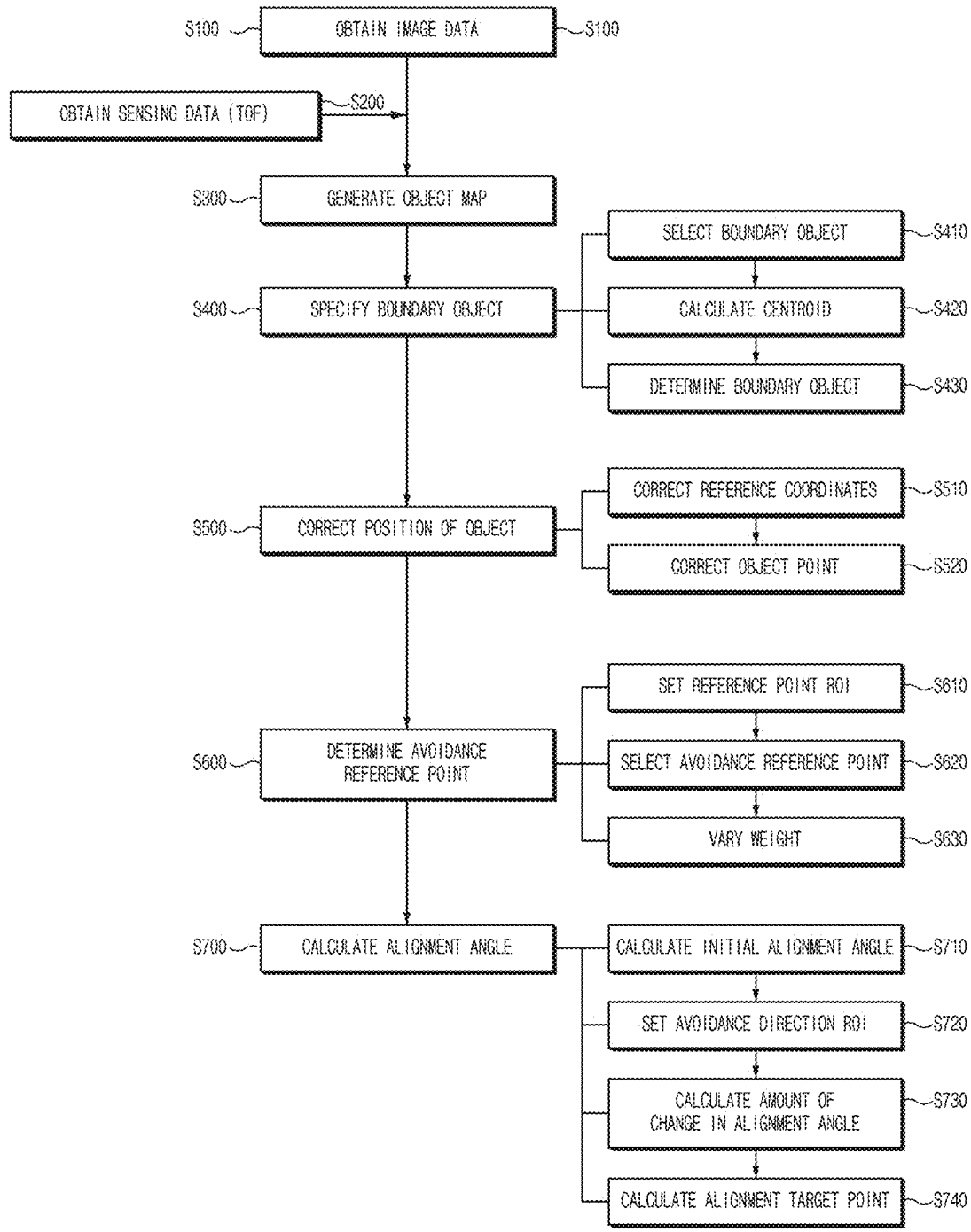
FIG. 19 is a drawing illustrating an operation of a parking assist method with improved avoidance steering control according to another embodiment of the present disclosure.

Next, a description is given of a parking assist method with improved avoidance steering control according to another embodiment of the present disclosure with reference to FIG. 19.

FIG. 19 is a drawing illustrating an operation of a parking assist method with improved avoidance steering control according to another embodiment of the present disclosure.

Referring to FIG. 19, the parking assist method with the improved avoidance steering control according to another embodiment of the present disclosure may include obtaining (S100) an object image around a parking space depending on front- and rear-view image data and side-view image data of a vehicle, which are captured by an SVM camera. The parking assist method may also include sensing (S200) a position of an object and a distance to the object depending on sensing data obtained by a sensor module. The parking assist method may also include storing (S300) coordinates of the object, which is detected from the image and is corrected in position by the sensing data, in an object map. The parking assist method may also include selecting (not shown) an avoidance reference point required for avoidance of the vehicle among coordinates of points making up the object and calculating an alignment angle of the vehicle required for avoidance steering based on the avoidance reference point.

S100 may comprise capturing front- and rear-view images and both side-view images of the vehicle using the SVM camera provided in the vehicle to obtain image data capable of identifying presence or absence of the object around the parking space the vehicle wants to enter and information about a direction where the object is located with respect to the vehicle.

In other words, S100 may comprise obtaining image data with a wider FOV, because of obtaining the image data by means of the SVM camera composed of four wide-angle cameras installed at the front and rear and both left and right sides of the vehicle.

Furthermore, when the sensor module is composed of an ultrasonic sensor, S200 may be to recognize a TOF and a direction of an ultrasonic signal, which is emitted from the ultrasonic sensor provided in the vehicle and is reflected and returned from a surrounding object and may sense presence or absence of the object and a distance to the object.

Furthermore, S300 may comprise detecting presence or absence of the object around the parking space and a position of the object based on the image data. S300 may also comprise matching and storing coordinates of points where there is the object on a local coordinate system with respect to the current location of the vehicle with classification information of the object. Thus, an object map indicating an object distribution situation for the parking space may be generated.

To this end, S300 may comprise dividing front and rear regions and both side regions of the vehicle, which are indicated on the image data captured by the SVM camera, into a plurality of cells divided at an event interval and assigning an address to each cell.

Furthermore, S300 may comprise identifying presence or absence of the object around the vehicle using an image indicated on the image data. S300 may also comprise comparing the image of the detected object with an object image on an object classification table previously stored to detect a type of the object.

In this case, S300 may comprise determining whether there is a point indicating an object image for each cell and determining that an image of the same object is detected together on the plurality of cells, when a classification code of the object detected on each cell is the same as a classification code of the object detected on another cell adjacent to the cell.

As such, S300 may comprise determining whether an image of the object is detected for each divided cell and whether the image is consecutively detected on the plurality of cells to identify an appearance of the object.

S300 may comprise identifying a point of an outer portion where the object is detected on each cell and storing coordinates of the respective points where the object is detected on a local coordinate system with respect to the current location of the vehicle together with position information to generate an object map.

As such, when the object is detected from the image data to generate the object map, the object on an ROI, which is a region superimposedly captured on the front- and rear-view image data and the side-view image data, may be detected on both of the two image data.

Accordingly, the parking assist method may further include determining (S400) whether a boundary object detected on an ROI where the front- and rear-view image data and the side-view image data are overlapped is identical to any of objects detected from at least one of the front- and rear-view image data or the side-view image data and specifying the object.

S400 may include selecting (S410) an object, an image of which is recognized on the ROI, among the front- and rear-view image data and the side-view image data as a boundary object. S400 may also include calculating (S420)

a first centroid and a second centroid, which are plane centers for point coordinates of the boundary object detected from each of the front- and rear-view image data and the side-view image. S400 may also include comparing (S430) distances between the first centroid and the second centroid, which are calculated for the boundary object, and specifying two boundary objects having a minimum distance as the same object.

S410 may comprise setting each of a front right region, a front left region, a rear right region, a rear left region of the vehicle to an ROI and selecting an object detected on a position or a cell corresponding to the ROI among the front- and rear-view image data and the side-view image data as a boundary object.

Furthermore, S420 may comprise calculating a first centroid using point coordinates of a boundary object detected on the position or the cell corresponding to the ROI between the front- and rear-view image data. S420 may also comprise calculating a second centroid using point coordinates of a boundary object detected on the position or the cell corresponding to the ROI between the side-view image data.

In this case, it is apparent that the centroid of only the detected points is calculated, when only a portion of the object is detected from the front- and rear-view image data or the side-view image data.

Furthermore, S430 may comprise selecting boundary objects to which the same obstacle classification code is matched among boundary objects on the front- and rear-view image data and boundary objects on the side-view image data in each ROI as targets for distance comparison of the centroid.

Thereafter, S430 may comprise calculating a distance between the first centroid and the second centroid calculated for each boundary object selected as the comparison target using a Euclidean norm and determining two boundary objects having minimum distance as the same object.

As such, the parking assist method may further include correcting (S500) a position of the object and storing the corrected position of the object in the object map, based on sensing data composed of a TOF of an ultrasonic signal, which is emitted from an ultrasonic sensor and is reflected and returned from the object when the sensor module is composed of the ultrasonic sensor, when objects detected from the front- and rear-view image data and the side-view image data are specified.

To this end, S500 may include selecting (S510) a point of the object closest to the ultrasonic sensor as reference coordinates, moving the reference coordinates in parallel to generate correction coordinates of the object, until meeting a circle, which is around the ultrasonic sensor and has a return path of sensing data (e.g., a TOF) for the reference coordinates as a radius. S500 may also include moving (S520) coordinates of the other points of the object in parallel in the same manner along the direction where the reference coordinates move to the correction coordinates.

In this case, S510 may comprise setting coordinates matched to a point of an object in which sensing data (e.g., a TOF) is measured to be shortest by the ultrasonic sensor to reference coordinates.

S510 may comprise calculating the correction coordinates by moving the reference coordinates in a direction facing a position where the SVM camera is installed on current coordinates (coordinates on the object map calculated based on the image data) to move the reference coordinates to the position sensed by the ultrasonic sensor.

Furthermore, S520 may comprise moving the other coordinates of the object stored in the object map in parallel along a vector direction where the reference coordinates move to the correction coordinates to correct the position of the object.

Accordingly, S520 may comprise identifying presence or absence of the object and a position of the object throughout a wide range based on the image data. S520 may also comprise specifying a coordinate position of the nearest point using the sensing data (e.g., the TOF) of the ultrasonic sensor. S520 may also comprise moving the other points of the object in parallel to correct the final position of the object. S520 may also comprise storing the corrected position of the object in the object map. Thus, accurate information about the presence or absence of the object around the parking space and the distance from each object may be obtained.

Furthermore, the parking assist method may further include selecting (S600) a point of the object the vehicle should avoid as an avoidance reference point based on a distance relationship between point coordinates of the object, which are stored in the object map, and a vehicle reference point of the vehicle which enters the parking space. The parking assist method may further include calculating (S700) an alignment angle required to perform steering control of the vehicle such that the vehicle avoids the avoidance reference point to enter the parking space.

In this case, S600 may include setting certain regions in a +y-axis direction of one side and a −y-axis direction of the other side with respect to the x-axis on the local coordinate system with respect to the center of the vehicle to a first reference point ROI and a second reference point ROI and setting (S620) a vehicle portion, which should avoid a contact with an object adjacent to the vehicle when the vehicle enters the parking space to a vehicle reference point. S600 may include selecting coordinates of the object with the minimum distance from the vehicle reference point among points of the object on the first reference point ROI and the second reference point ROI as an avoidance reference point.

S610 may comprise setting the set first reference point ROI and the set second reference point ROI to certain regions in the +y-axis direction and the −y-axis direction on any local coordinate system having the center of the vehicle as the x-axis. In other words, when the vehicle enters the parking space between objects, the vehicle reference points set on ends of both sides of the vehicle may be set to a region of a certain range where collision may be predicted.

The set first reference point ROI and the set second reference point ROI may be regions for determining preliminary points capable of being selected as the avoidance reference point.

Furthermore, S620 may comprise setting the left end of the bumper of the vehicle to a first vehicle reference point, may comprise setting the central end of the bumper of the vehicle to a second vehicle reference point, and may comprise setting the right end of the bumper of the vehicle to a third vehicle reference point. It is apparent that coordinates on the local coordinate system with respect to the center of the vehicle may be assigned to the set first to third vehicle reference points.

Thereafter, S620 may comprise calculating a distance between the vehicle reference point and the object point on each reference point ROI and selecting a point with the minimum distance as the avoidance reference point.

In this case, S600 may further include increasing and applying (S630) a weight in the y-axis direction as a distance between the vehicle, which is entering the parking space, and the object decreases, in selecting the point with the minimum distance from the vehicle reference point among a plurality of object points on the reference point ROI.

Accordingly, when the x-axis distance between the vehicle and the object is greater than a predetermined reference distance, a point on coordinates where the x-axis distance from the vehicle reference point is close may have a high weight to be selected as an avoidance reference point. When the x-axis distance between the vehicle and the object is less than the reference distance, a point on coordinates where the y-axis distance from the vehicle reference point is close may have a high weight to be selected as the avoidance reference point.

Furthermore, S700 may include calculating (S710) an average of angles defined by the vehicle reference point set on the front center of the vehicle and the avoidance reference point as an initial alignment angle required such that the vehicle enters the parking space while avoiding the object. S700 may also include setting (S720) an avoidance direction ROI using an avoidance reference line, which is a straight line parallel to a center reference line being a straight line indicating the initial alignment angle and passes through each avoidance reference point. S700 may also include calculating (S730) the amount of change in alignment angle, which should increase and decrease for avoidance steering of the object depending on a degree to which the vehicle enters the parking space and providing the amount of change in alignment angle as data for avoidance steering control of the vehicle.

In this case, S710 may comprise calculating an average of angles, defined by the second vehicle reference point set on the front center of the vehicle and the first avoidance reference point selected on the object located at the left side of the vehicle and the second avoidance reference point selected on the object located at the right side of the vehicle, as the initial alignment angle. Steering control may be performed such that the vehicle may enter the parking space depending on the calculated initial alignment angle.

S720 may comprise setting the avoidance direction ROI using the first avoidance reference line and the second avoidance reference line. The first avoidance reference line is a straight line parallel to the center reference line, which is a straight line indicating the current initial alignment angle. The first avoidance reference line passes through the first avoidance direction ROI. The second avoidance reference line is a straight line parallel to the center reference line as discussed above. The second avoidance reference line passes through the second avoidance direction ROI.

Accordingly, S720 may comprise setting a region between the first avoidance reference line passing through a first avoidance point and the center reference line to the first avoidance direction ROI. S720 may comprise setting a region between the second avoidance reference line passing through a second avoidance point and the center reference line to the second avoidance direction ROI.

The first avoidance direction ROI and the second avoidance direction ROI are provided as regions where object points for calculating the amount of change in alignment angle of the vehicle are selected. In other words, only points on the first avoidance direction ROI and the second avoidance direction ROI may be used for cost calculation for calculating the amount of change in alignment angle.

Furthermore, S730 may comprise obtaining the sum of distances between points of the object in the first avoidance direction ROI and the first avoidance reference line and the sum of distances between points of objects in the second avoidance direction ROI and the second avoidance reference line using a Euclidean norm. S730 may also comprise calculating the amount of change in alignment angle such that a cost which is a difference between the two sums of distances becomes minimal.

In other words, as the vehicle enters the parking space, the first avoidance reference point and the second avoidance reference point are varied. As the first avoidance reference line and the second avoidance reference line are varied due to this, the first avoidance direction ROI and the second avoidance direction ROI are varied.

Thus, as points of the object in each avoidance direction ROI are varied, the amount of change in alignment angle calculated based on distances between the points of the object and each avoidance reference line are also varied.

As steering control is performed such that the calculated amount of change in alignment angle may be reflected in the current alignment angle of the vehicle, the vehicle may fail to collide with the object having a point selected as the avoidance reference point while entering the parking space. Furthermore, the vehicle may be safely parked in a state where a difference between distances from both the avoidance reference points or both the avoidance reference lines is kept relatively equal (i.e., a state where the cost calculated by Equation 6 above is minimal).

In this case, as shown in FIG. 14, S730 may comprise repeating the process of setting the avoidance direction ROI at the current alignment angle of the vehicle. S730 may also comprise repeating the process of calculating the cost using the coordinates of the point in each avoidance direction ROI. S730 may also comprise repeating the process of calculating the amount of change in alignment angle with the minimum cost. S730 may also comprise repeating the process of updating the current alignment angle a predetermined number of times (the number of times of iterative calculation (K) is set to 10 times in FIG. 14, but is not limited to a specific number of times, and the number of times may increase and decrease) and outputting the result as the updated alignment angle.

Furthermore, S700 may further include selecting (740) each object having each avoidance reference point as a point as a target object, which is the final avoidance target, when it is determined that the vehicle enters the parking space between objects, and calculating a position corresponding to an average of coordinates values of the two avoidance reference points as an alignment target point on which the vehicle should stop between two objects.

To this end, S740 may comprise selecting each object having the avoidance reference point on a region in the +y-axis direction and the avoidance reference point on a region in the −y-axis direction as points as the target object which is the final avoidance target, when it is determined that the vehicle enters the parking space between objects.

In this case, S740 may comprise selecting the avoidance reference point determined when the vehicle enters the parking space as a space entrance avoidance reference point. S740 may also comprise calculating a new avoidance reference line representing coordinates of points, which are greater in x-axis coordinate value than the x-coordinates of the space entrance avoidance reference point among points of the target object using a least square method.

S740 may comprise guiding the vehicle to reach the alignment target point and park, while performing steering control at the alignment angle of the vehicle using the newly calculated avoidance reference line.

Furthermore, the parking assist method may further include generating (not shown) and providing an avoidance path guiding the vehicle to the parking space while avoiding the object depending on the alignment angle updated by reflecting the amount of change in alignment angle calculated in S700. The parking assist method may further include generating (not shown) a steering control command required to drive along the avoidance path and transmitting the steering control command to a steering device. Thus, autonomous parking in the parking space may be performed while stably avoiding a collision with the object.

The present disclosure may correct a position of an object detected from image data generated by the SVM camera with a wide field of view (FOV) using sensing data (e.g. a TOF) obtained by the sensor module capable of measuring an accurate distance. Thus, the accuracy of detecting a surrounding object upon autonomous parking may be improved and stable avoidance steering depending on the improved accuracy may be improved.

In addition, various effects ascertained directly or indirectly through the present disclosure may be provided.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims. All the technical ideas within the scope equivalent to the claims should be included in the scope of the present disclosure.

What is claimed is:

1. A parking assist system with improved avoidance steering control, the parking assist system comprising:
    a sensor configured to detect a distance between a vehicle and an object using sensing data obtained by scanning the periphery of the vehicle;
    a surround view monitor (SVM) camera configured to capture an image around the vehicle to obtain image data capable of detecting a position and a direction of the object;
    a memory configured to store program instructions; and
    a processor configured to execute the program instructions, the program instructions when executed configured to:
        fuse the sensing data of the sensor and the image data of the SVM camera to calculate position information of the object with respect to a current position of the vehicle;
        avoid the object based on the position information and perform steering control of the vehicle for autonomous parking;
        determine a region of interest (ROI) where front- and rear-view image data and both side-view image data are overlapped;
        select an object, which is detected on the ROI of front- and rear-view image data and side-view image data, as a boundary object;
        calculate a first centroid of a boundary object image detected from the front- and rear-view image data and a second centroid of a boundary object image detected from the side-view image data; and
        determine a boundary object, which has the minimum distance between the first centroid and the second centroid calculated for the boundary object to which the same object classification code is matched, as the same object.

2. The parking assist system of claim 1, wherein the the processor is configured to:
    divide a region around the vehicle on the image data obtained by the SVM camera into cells, each of which has a certain interval, and assign an address to each cell;
    detect presence or absence of the object based on the image data and classify a type of the detected object to detect the object which is present in a parking area; and
    match and store a cell address of a position where the object is detected on the image data with classification information of the object and generate an object map indicating an object distribution situation for the parking area.

3. The parking assist system of claim 1, wherein the sensor comprises an ultrasonic sensor configured to obtain the sensing data using a time of flight (TOF) of an ultrasonic wave, and
    wherein the processor is further configured to:
    correct and store a position of the object detected from the image data and stored on the object map, based on the sensing data of the ultrasonic sensor.

4. The parking assist system of claim 3, wherein the processor is further configured to:
    select a point of the object closest to the ultrasonic sensor as reference coordinates;
    move the reference coordinates on the same cell;
    set the moved reference coordinates to correction coordinates of the object, until meeting a circle which is around the ultrasonic sensor and has a return path of sensing data for the reference coordinates as a radius; and
    move coordinates of the other points of the object in parallel in the same manner along the direction where the reference coordinates move to the correction coordinates to correct the position of the object.

5. The parking assist system of claim 3, wherein the processor is further configured to:
    when several sensing data are received for one object, correct the position of the object using each of the several sensing data;
    calculate an average of coordinates indicating the corrected position of the object; and
    correct the calculated average to a final position of the object.

6. The parking assist system of claim 3, wherein the processor is further configured to:
    select a point of the object the vehicle should avoid when the vehicle enters a parking space as an avoidance reference point, based on coordinates indicating a point of the object stored in the object map; and
    calculate an alignment angle at which the vehicle should be aligned such that the vehicle entering the parking space avoids the object to park.

7. The parking assist system of claim 6, wherein the processor is further configured to:
    set a vehicle portion, which should avoid a contact with an object adjacent to the vehicle when the vehicle enters the parking space to a vehicle reference point;
    set certain regions in a +y-axis direction at one side of an x-axis and a −y-axis direction at the other side on a local coordinate system with respect to the center of the vehicle to a first reference point ROI and a second reference point ROI; and select a point with the minimum distance from the vehicle reference point among object points on each reference point ROI as the avoidance reference point on each reference point ROI.

8. The parking assist system of claim 6, wherein the processor is further configured to:
select the avoidance reference point based on the x-axis distance between the vehicle reference point and the object, when an x-axis distance between the vehicle and the object is greater than a predetermined reference distance; and
select the avoidance reference point based on the y-axis distance between the vehicle reference point and the object, when an x-axis distance between the vehicle and the object is than the reference distance.

9. The parking assist system of claim 6, wherein the processor is further configured to:
calculate an average of angles defined by a vehicle reference point set on the front center of the vehicle and the avoidance reference point as an initial alignment angle of the vehicle entering the parking space;
calculate an amount of change in alignment angle which should increase and decrease for avoidance steering depending to a degree to which the vehicle enters the parking space; and
provide the calculated initial alignment angle and the calculated amount of change in alignment angle as data for avoidance steering control of the vehicle.

10. The parking assist system of claim 6, wherein the processor is further configured to:
using the first avoidance reference line and the second avoidance reference line, which are straight lines, each of which is parallel to the center reference line being a straight line indicating a current initial alignment angle and passes through each avoidance reference point,
set a region between a first avoidance reference line and a center reference line to a first avoidance direction ROI;
set a region between a second avoidance reference line and the center reference line to a second avoidance direction ROI,
obtain the sum of distances between points of an object in the first avoidance direction ROI and the first avoidance reference line and the sum of distances between points of objects in the second avoidance direction ROI and the second avoidance reference line; and
calculate an amount of change in alignment angle for correcting the initial alignment angle such that a difference between the two sums of distances becomes minimal.

11. A parking assist method with improved avoidance steering control, the parking assist method comprising:
obtaining an object image around a parking space using front- and rear-view image data and side-view image data of a vehicle, the front- and rear-view image data and the side-view image data being captured by an SVM camera;
detecting a position of an object and a distance to the object using sensing data obtained by a sensor;
storing, by a processor, coordinates of the object which is detected from the image data and is corrected in position by the sensing data in an object map;
selecting, by a processor, an avoidance reference point required for avoidance of the vehicle among coordinates of points making up the object and calculating an alignment angle of the vehicle, the alignment angle being required for avoidance steering based on the avoidance reference point; and
specifying the object,
wherein the specifying of the object includes:
determining an ROI where front- and rear-view image data and both side-view image data are overlapped;
selecting an object, which is detected on the ROI of front- and rear-view image data and side-view image data, as a boundary object;
calculating a first centroid of a boundary object image detected from the front- and rear-view image data and a second centroid of the boundary object image detected from the side-view image data; and
determining a boundary object, which has the minimum distance between the first centroid and the second centroid calculated for the boundary object to which the same object classification code is matched, as the same object.

12. The parking assist method of claim 11, wherein the calculating of the alignment angle of the vehicle includes:
selecting a point of the object closest to the sensor as reference coordinates in generating the object map and moving the reference coordinates in a direction facing a position where the SVM camera is installed to generate correction coordinates of the object, until meeting a circle which is around the sensor and has a return path of sensing data for the reference coordinates as a radius; and
moving coordinates of the other points of the object in parallel in the same manner along a direction where the reference coordinates to the correction coordinates.

13. The parking assist method of claim 11, wherein the calculating of the alignment angle of the vehicle includes:
selecting a point of the object the vehicle should avoid as the avoidance reference point, based on a distance relationship between point coordinates of the object stored in the object map and a vehicle reference point set on a vehicle portion which should avoid a contact with the object in the vehicle entering the parking space; and
calculating the alignment angle required to perform steering control of the vehicle, such that the vehicle avoids the avoidance reference point and enters the parking space.

14. The parking assist method of claim 13, wherein the selecting as the avoidance reference point includes:
setting certain regions in a +y-axis direction at one side of an x-axis and a −y-axis direction at the other side on a local coordinate system with respect to the center of the vehicle to a first reference point ROI and a second reference point ROI; and
selecting coordinates of the object with the minimum distance from the vehicle reference point among points of the object on the first reference point ROI and the second reference point ROI as the avoidance reference point.

15. The parking assist method of claim 13, wherein the selecting as the avoidance reference point further includes:
increasing and applying a weight in a y-axis direction as a distance between the vehicle which is entering the parking space and the object decreases, in selecting a point with the minimum distance from the vehicle reference point among a plurality of object points on a reference point ROI.

16. The parking assist method of claim 13, wherein the calculating of the alignment angle includes:

calculating an average of angles defined by a vehicle reference point set on the front center of the vehicle and the avoidance reference point as an initial alignment angle such that the vehicle avoids the object and enters the parking space;

setting a region between a first avoidance reference line and a center reference line to a first avoidance direction ROI and setting a region between a second avoidance reference line and the center reference line to a second avoidance direction ROI, using the first avoidance reference line and the second avoidance reference line, which are straight lines, each of which is parallel to the center reference line being a straight line indicating the initial alignment angle and passes through each avoidance reference point; and obtaining the sum of distances between points of an object in the first avoidance direction ROI and the first avoidance reference line and the sum of distances between points of objects in the second avoidance direction ROI and the second avoidance reference line and calculating an amount of change in alignment angle for correcting the initial alignment angle such that a difference between the two sums of distances becomes minimal.

17. A parking assist method with improved avoidance steering control, the parking assist method comprising:

obtaining an object image around a parking space using front- and rear-view image data and side-view image data of a vehicle, the front- and rear-view image data and the side-view image data being captured by an SVM camera;

detecting a position of an object and a distance to the object using sensing data obtained by a sensor;

storing, by a processor, coordinates of the object which is detected from the image data and is corrected in position by the sensing data in an object map; and selecting, by a processor, an avoidance reference point required for avoidance of the vehicle among coordinates of points making up the object and calculating an alignment angle of the vehicle, the alignment angle being required for avoidance steering based on the avoidance reference point, wherein the calculating of the alignment angle of the vehicle includes:

selecting a point of the object closest to the sensor as reference coordinates in generating the object map and moving the reference coordinates in a direction facing a position where the SVM camera is installed to generate correction coordinates of the object, until meeting a circle which is around the sensor and has a return path of sensing data for the reference coordinates as a radius; and moving coordinates of the other points of the object in parallel in the same manner along a direction where the reference coordinates to the correction coordinates.

* * * * *